United States Patent
Dara-Abrams et al.

(10) Patent No.: US 6,456,892 B1
(45) Date of Patent: Sep. 24, 2002

(54) DATA DRIVEN INTERACTION FOR NETWORKED CONTROL OF A DDI TARGET DEVICE OVER A HOME ENTERTAINMENT NETWORK

(75) Inventors: Joseph Alexander Dara-Abrams, Los Altos; Harold Aaron Ludtke; Thomas Edward Birmingham, both of San Jose, all of CA (US); Neil David Matthews, Tadley (GB); Yoshifumi Yanagawa, Kyoto (JP); Wim Bronnenberg, Geldrop (NL)

(73) Assignees: Sony Electronics, Inc., Park Ridge, NJ (US); Sony Corporation, Tokyo (JP)

( * ) Notice: Subject to any disclaimer, the term of this patent is extended or adjusted under 35 U.S.C. 154(b) by 0 days.

(21) Appl. No.: 09/183,163

(22) Filed: Oct. 30, 1998

Related U.S. Application Data

(63) Continuation-in-part of application No. 09/108,265, filed on Jul. 1, 1998, now Pat. No. 6,148,241.

(51) Int. Cl.$^7$ ............................ G05B 15/00; G06F 13/00
(52) U.S. Cl. ............................ 700/83; 700/17; 709/328; 710/10; 710/72
(58) Field of Search .............................. 700/11, 12, 17, 700/83; 710/8, 10, 12, 72; 709/201, 203, 217, 218, 220, 321, 328; 345/173, 326, 339, 327, 718, 746, 764, 810; 712/1

(56) References Cited

U.S. PATENT DOCUMENTS

| | | | |
|---|---|---|---|
| 4,893,199 A | 1/1990 | Okada | 360/48 |
| 5,086,385 A | 2/1992 | Launey et al. | 364/188 |

(List continued on next page.)

FOREIGN PATENT DOCUMENTS

| | | |
|---|---|---|
| JP | 2767795 | 3/1989 |

OTHER PUBLICATIONS

Sony et al., Specification of the Home Audio/Video Interoperability (HAVi) Architecture, May 11, 1998.

*Primary Examiner*—Leo Picard
*Assistant Examiner*—Steven R. Garland
(74) *Attorney, Agent, or Firm*—Wagner, Murabito & Hao LLP

(57) ABSTRACT

A method and system for providing a user interface for a networked target device within a home audio/visual network. The DDI allows any DDI target to describe its physical appearance including controls and displays, etc., to a DDI controller. The controller can be a remote physical device or can be a software program resident on the same or separate device as the target. The controller interfaces with the target to obtain the DDI data and generates a user interface for the target including: 1) interactive controls; and 2) user display information pertinent to the target. The DDI allows the controller to trigger actions on the target as if a user had physically manipulated the controls of the target. The controller and the target are connected to the same communication network. A particular embodiment operates within the HAVi architecture. The controller communicates with the user by using the input and output devices of (typically) the device upon which the controller is executing. This communication can be done in a controller-implementation-dependent manner. The target can be a DCM that controls its device in a implementation-dependent manner. The controller may be written in a generic manner that does not need to be implemented with knowledge of a particular target in mind; all target-dependencies are represented in the DDI data provided by the target to the controller.

24 Claims, 16 Drawing Sheets

U.S. PATENT DOCUMENTS

| | | | |
|---|---|---|---|
| 5,420,573 A | 5/1995 | Tanaka et al. | 340/825.24 |
| 5,500,794 A | 3/1996 | Fujita | 364/188 |
| 5,519,878 A | 5/1996 | Dolin | 395/800 |
| 5,537,605 A | 7/1996 | Teece | 395/800 |
| 5,570,085 A | 10/1996 | Bertsch | 340/825.07 |
| 5,621,662 A | 4/1997 | Humprhies et al. | 364/550 |
| 5,657,221 A * | 8/1997 | Warman et al. | 700/83 |
| 5,706,191 A | 1/1998 | Bassett et al. | 364/138 |
| 5,796,607 A | 8/1998 | Le Van Suu | 364/140.01 |
| 6,020,881 A * | 2/2000 | Naughton et al. | 345/327 |

\* cited by examiner

DATA DRIVEN INTERACTION FOR NETWORKED CONTROL OF A DDI TARGET DEVICE OVER A HOME ENTERTAINMENT NETWORK

RELATED UNITED STATES PATENT APPLICATION

The present application is a continuation-in-part of patent application Ser. No. 09/108,265, now U.S. Pat. No. 6,148, 241, filed on Jul. 1, 1998 entitled "A Method and System for Providing a User Interface for a Networked Device Using DDI Descriptor Information," by Harold Aaron Ludtke, Harumi Kawamura and Hisato Shima and assigned to the assignee of the present application and incorporated herein by reference.

BACKGROUND OF THE INVENTION

1. Field of the Invention

The present invention relates to the field of consumer electronic devices. More specifically, the present invention relates to methods and systems for providing user interfaces for networked electronic devices including remote devices.

2. Related Art

The typical home entertainment system today consists of a variety of different consumer electronic devices which present and record audio/visual media in different ways. In the field of media devices, there is a spectrum of features for products of a given class (VCRs, video camera, etc.). Most of the features are represented by physical controls or elements on a control panel on the device which can be manipulated by a human user.

For instance, typical home audio-visual (AV) equipment includes a number of components such as a radio receiver or "tuner," a compact disk (CD) player and/or a digital video disc player (DVD), a number of speakers, a television, a video cassette recorder (VCR), a tape deck, and the like. Each of these components is connected to the others via a set of wires. One component is usually the central component of the home AV system; for example, the tuner. The tuner has a number of specific inputs for coupling the other components. Tuner-based control is often limited to connecting/disconnecting another component's AV input or output. The tuner has a corresponding number of control buttons or control switches which provide a limited degree of controllability and interoperability for the components. However, only rarely does a tuner control the component's operation (e.g., rewind, play, etc.). The control buttons and control switches are usually located on the front of the tuner providing the user with a so-called hard front panel interface. In many cases, some, or all, of these buttons and switches are duplicated on a hand-held remote control unit, another type of hard front panel interface. A user controls the home AV system by manipulating the buttons and switches on the front of the tuner or, alternatively, by manipulating buttons on the hand-held remote control unit. This conventional home AV system paradigm has become quite popular.

As consumer electronic devices become more capable and more complex, the demand for the latest and most capable devices has increased. As new devices emerge and become popular, the devices are purchased by consumers and "plugged" into their home AV systems. As a consumer purchases new devices (e.g., digital audio tape recorders, digital video disk players, digital camcorders, and the like), most often the new device is simply plugged into the system alongside the pre-existing, older devices (e.g., cassette tape deck, CD player, and the like). The new device is plugged into an open input on the back of the tuner or into some other device coupled to the tuner. The consumer (e.g., the user) controls the new device via the control buttons on the tuner, via the control buttons and control switches on the front of the new device itself, or via an entirely new and separate remote control unit for the new device.

As the number of new consumer electronic devices for the home AV system have grown and as the sophistication and capabilities of these devices have increased, a number of problems with the conventional paradigm have emerged. One such problem is incompatibility between devices in the home AV system. Consumer electronic devices from one manufacturer often couple to an AV system in a different manner than similar devices from another manufacturer. For example, a tuner made by one manufacturer may not properly couple with a television made by another manufacturer.

In addition, where one device is much newer than another device, additional incompatibilities may exist. For example, a new device might a incorporate hardware (e.g., specific inputs and outputs) which enables more sophisticated remote control functions. This hardware may be unusable with older devices within the AV system. Also, for example, older tuners may lack suitable inputs for some newer devices (e.g., mini-disc players, VCRs, etc.), or may lack enough inputs for all devices of the system. Another problem is the lack of functional support for differing devices within an AV system. For example even though a television may support advanced sound formats (e.g., surround sound, stereo, etc.), if an older and less capable tuner does not support such functionality, the benefits of the advanced sound formats can be lost.

Another problem is the proliferation of controls for the new and differing devices within the home AV system. For example, similar devices from different manufacturers can each have different control buttons and control switch formats for accomplishing similar tasks (e.g., setting the clock on a VCR, programming a VCR record a later program, and the like). In addition, each new device coupled to the AV system often leads to another dedicated remote control unit for the user to keep track of and learn to operate.

To address the problems above, a home AV network has been proposed for consumer electronic devices, including computing devices (e.g., personal computers and peripheral devices such as printers). The home AV network would provide a set of services which facilitate device interoperability and allow the devices to cooperate to perform application tasks. By connecting consumer electronic devices in a home AV network, it is also possible to share processing and storage resources. In addition, a home AV network allows consumer electronic devices to be coordinated and simultaneously controlled by a user, thereby simplifying that aspect of operation from the user's perspective. The underlying structure of a home AV network consists of a set of interconnected clusters of devices. Typically, there may be more than one cluster in a home, perhaps one per floor or one per room. Each cluster functions as a set of interconnected devices to provide services to a single user or to multiple simultaneous users.

Recently, a class of consumer electronic media devices has been proposed that can be networked together using a particular type of network using a standard communication protocol layer, e.g., IEEE 1394 communication standard. The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to covert digital data to an analog form before it is transmitted across the bus. Correspondingly, a receiving application will receive digital data from the bus, not analog data and will therefore not be required to convert analog data to digital form. The IEEE 1394 is ideal for consumer electronics communication in part because devices can be added to or removed from the serial bus while the bus is active. If a device is so added or removed, the bus automatically reconfigures itself for transmitting data between the then existing devices. Each device on the bus is a "node" that has its own address on the bus and contains its own address space. Each node connected to the bus is capable of communicating with any other node also on the bus.

The provision of the IEEE 1394 serial communication bus for networking consumer electronic devices has introduced a powerful new platform on which device functionality and inter-operability can be built. For instance, in such a system, complex operations involving media transfers, media recordings and media presentation can be performed that involve two or more devices acting in concert. However, interaction between these devices can be complex, error prone and laborious if it is required that each device be directly touched in order to properly configure the desired operation. The problems associated with properly configuring the media operation can be exacerbated if one or more of the devices are remotely located and/or need constant attention and or adjustment. What is needed is an effective mechanism for interfacing with networked consumer electronic devices to facilitate media operations between two or more devices.

The physical separation between devices in a home AV network introduces a problem regarding control of a particular device. A user may be trying to remotely control a device that is physically separated from the user and thus is not able to be seen. For example, a VCR on the home AV network may be in one room, while the user is in another room containing the television. Therefore, the user is not sure whether he/she entered in the proper commands and that the device is correctly performing the desired function.

Another problem is introduced when there are multiple users simultaneously on the home AV network, each user working from a separate location. Thus, continuing the example above, more than one user may be attempting to control the VCR. Each user, not aware of the fact that there is another user also trying to use the VCR, will be entering commands that are perhaps conflicting and that are not being carried out properly. In addition, each user will not have information regarding the status of the VCR (e.g., whether the VCR is recording or playing), and thus will not be aware of whether they successfully entered the proper commands and whether the device is performing the desired function.

In addition, it is often desired to provide remote control access to the features performed by a consumer electronic device so that these devices can be accessed from a central location within a home or office. However, not all consumer electronic devices are able to provide a sophisticated display system for remote interaction, e.g., some devices offer only a small liquid crystal display (LCD) or a small collection of light emitting diodes (LEDs) as display devices. What is needed is a mechanism for interfacing remotely with devices that provides a sophisticated level of user interaction for devices of differing local display capability. Also, in many consumer electronic systems, each device can have its own remote control unit. In systems having even a modest amount of devices, the user discovers that three or more different and bulky remote control devices are required to perform media operations. What is needed is a mechanism for interfacing with electronic devices that reduces the problems of having different remote control units for different devices. What is needed further is a mechanism for interfacing with electronic devices that is flexible and can adapt to new devices and device types within the consumer electronics market.

SUMMARY OF THE INVENTION

Accordingly, the present invention provides an effective mechanism for interfacing with networked consumer electronic devices to facilitate media operations between two or more devices. The present invention also provides a mechanism for interfacing remotely with devices and that provides a sophisticated level of user interaction for many devices that themselves may have limited display capability. The present invention also provides a mechanism for interfacing with electronic devices that operates using a remote controller and a central display for instructing different electronic devices and for receiving status information regarding the different electronic devices. The present invention provides an interface mechanism for interfacing with electronic devices that is additionally flexible and can adapt to new devices and device types within the consumer electronics market. The present invention provides the above advantageous features within one embodiment that is compliant with the Home Audio/Visual Interoperability (HAVi) architecture. These and other advantages of the present invention not specifically mentioned above will become clear within discussions of the present invention presented herein.

A method and system are described herein for providing a user interface for a networked electronic device using a data driven interface (DDI) including a data structure of information maintained between a DDI target device and a DDI controller. The present invention utilizes the DDI to allow any compliant device (e.g., a DDI target device) to have the physical appearance of its controls and displays (e.g., elements) represented by a data structure used by another device (e.g., a DDI controller) and allows the DDI controller to thereby trigger actions on the DDI target device as if a user had directly physically manipulated the controls on the DDI target device. The present invention operates within a network of consumer electronic devices, e.g., television (TV), set-top-box, video cassette recorder (VCR), compact disk (CD) device, personal computer system (PC), etc., that are coupled together using a standard communication protocol layer, e.g., the IEEE 1394 serial communication standard. A DDI controller (e.g., a TV or set-top-box or computer system or other intelligent electronic device) monitors the network to discover the units coupled thereto and is programmed to locate DDIs that are defined for a DDI target device. The DDI target device may be remotely located. In one embodiment, the network is compliant with the HAVi architecture.

In general, the DDI provides the DDI controller with information for rendering a depiction of the controls and displays of the DDI target device and this depiction can be interacted with by a user for remotely triggering actions by the DDI target device. The DDI is defined such that command interpretations and image alterations are controlled by the DDI target device thereby reducing the responsibility of the DDI controller in managing the user interface with generic user events. This approach allows increased flexibility to expand the user interface and adjust to future control types and display information protocols.

The DDI uses graphical user interface (GUI) "elements" stored in a data structure to define the physical controls of the DDI target device. The GUI elements include standard types of controls and displays (e.g., push buttons, toggles, sliders, dials, LCD screens, alphanumeric inputs, etc.) that are commonly found on consumer electronic devices. The control types have well defined behaviors (e.g., buttons are pushed, dials are moved, values are input, etc.). In addition, the DDI defines a set of "user events" which can be applied to any of these controls by the user. The user events are defined to be sufficiently generic so that they apply to most types of controls. The purpose of these generic user events is to encapsulate the typical user manipulated action for the GUI elements and to let the DDI target device decide the manner in which to interpret the user actions on its own thereby relieving the DDI controller of these responsibilities. Related elements of a DDI target device can be organized together into logical groups which the DDI allows to be displayed or processed together in special ways. The DDI controller is responsible for the exact visual appearance of the GUI elements and their exact layout on its display.

The internal state of the DDI target is maintained by the DDI target which keeps the DDI controller informed of its status. The DDI target forwards status update messages (upon changes of state) to the DDI controller to update its graphical display for the user. A status notification commands also allows the DDI controller to poll the DDI target for changes in state.

A particular embodiment of the present invention operates within the HAVi architecture. Using the DDI mechanism, a HAVi software element can provide a user with the ability to control another software element. Within this interaction, the first software element is termed the DDI controller and the second software element the DDI target. The DDI controller uses a description of the User Interface (UI) to be presented to the user and is obtained from the DDI target. The means by which this control is accomplished is described herein.

In this particular embodiment, the DDI controller and its DDI target are both HAVi components each executing on an IAV or FAV device. The components may be on the same or different devices, implemented using native code or Java bytecode; in all cases, though, they interact by sending HAVi messages to each other. The DDI controller communicates with the user by using the input and output devices of (typically) the device upon which the controller is executing. This input/output communication can be done in a controller-implementation-dependent manner. The DDI target can be a DCM that controls its device in a implementation-dependent manner. The HAVi DDI protocol described herein is structured so that a DDI controller may be written in a generic manner. That is, a DDI controller does not have to be implemented with knowledge of a particular DDI target in mind; all target-dependencies are represented in the DDI data provided by the target to the controller.

DETAILED DESCRIPTION OF THE INVENTION

Figure 1:
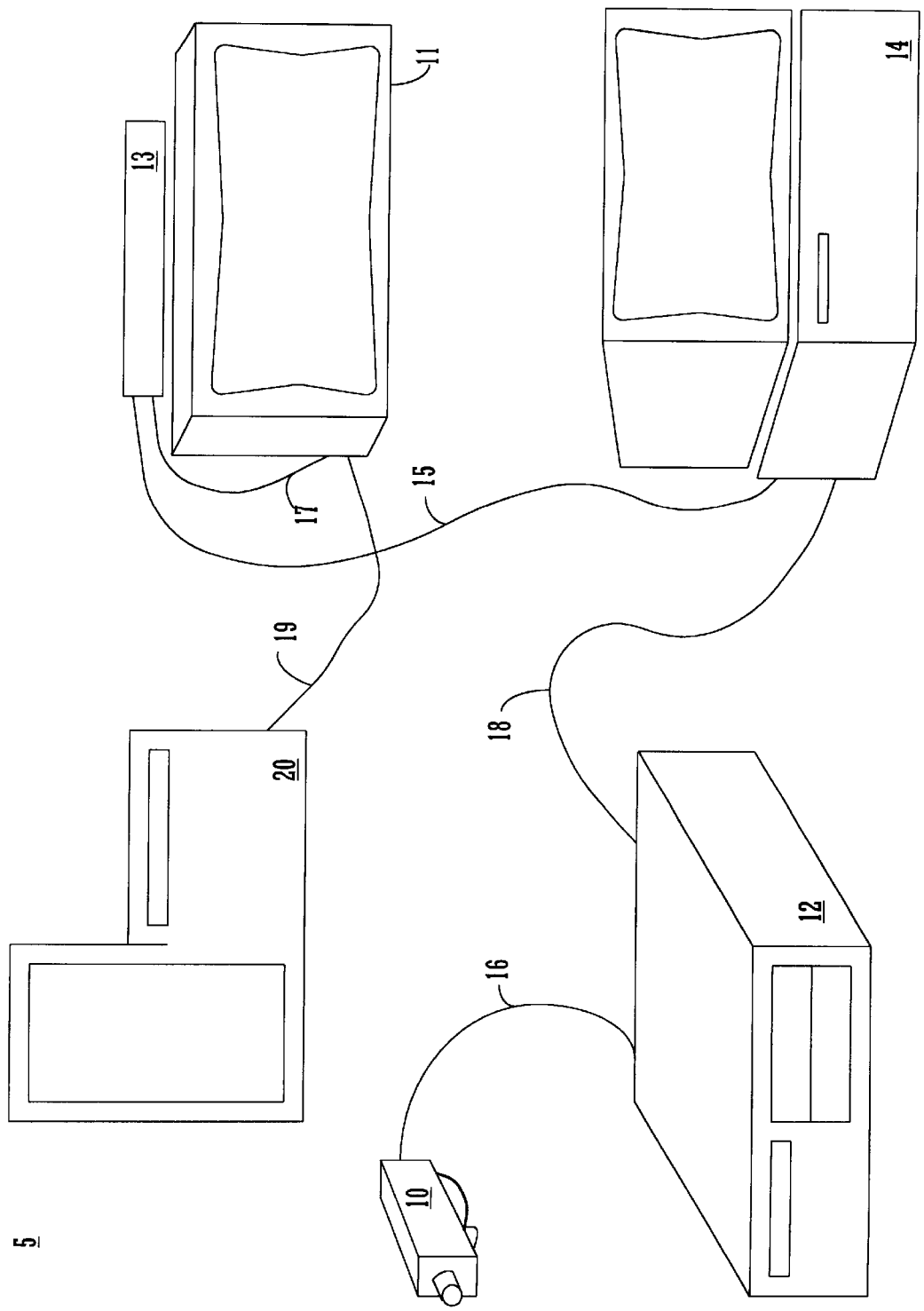
FIG. 1 illustrates an exemplary networked system of electronic devices including a video camera, a video cassette recorder, a computer, a set-top-box, a television and a compact disk changer.

In the following detailed description of the present invention, a data driven interface (DDI) for allowing a DDI controller device to remotely interface with a DDI target device within a network of consumer electronic devices, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

The present invention is drawn to a DDI that allows any compliant device (e.g., "DDI target device") to describe its physical appearance including controls and displays, etc., to a DDI controller. The DDI controller can be a remote physical device or can be a software program resident on the same or separate device as the DDI target. The DDI controller interfaces with the DDI target to obtain the DDI data and generates a user interface for the DDI target device including: 1) interactive controls; and 2) user display information pertinent to the DDI target device. The DDI allows the DDI controller to trigger actions on the DDI target device as if a user had physically manipulated the controls of the DDI target device. The DDI controller and the DDI target device are connected to the same communication network (e.g., using the IEEE 1394 serial standard). The present invention can also be used in one embodiment to promote high levels of inter-operability between any of the devices.

Generally, the present invention allows the DDI controller to communicate with the DDI of the DDI target device and inquire about the various types of controls which it has, e.g., buttons, dials, sliders, etc., which are represented as graphical user interface (GUI) elements within the DDI. The DDI controller then generates, on its display, a user interface based on these control object descriptions, and when the user manipulates this user interface, the controller sends special user events to the DDI target device. The information that is capable of being displayed by the DDI controller can be made scaleable by the DDI target device so that the human interface displayed can adapt to the particular display capabilities of the DDI controller device. The DDI controller monitors the DDI target device to maintain the most current status presented to the user.

The DDI controller does not need to have advance knowledge of any specific features in the DDI target device or how they are used or invoked because this functionality is the responsibility of the DDI target device. All issues such as state transitions and inter-control dependencies are handled automatically the by DDI target device independently of the DDI controller. The present invention removes all requirements for items such as state transition tables and their execution environment, because it takes advantage of the functionality that is already built into a media device and used to handle the physical buttons as they are manipulated by the user. For instance, when the DDI controller asks the target to "simulate the press of button 5," the DDI controller does not need to have any knowledge at all about what is happening within the DDI target device upon being notified of the user action. The state transition logic for what happens when "button 5" is pressed is all contained within the DDI target device. This is advantageous because it enhances the inter-operability between the DDI controller and the DDI target device while at the same time greatly reduces the responsibilities of each.

In addition to describing physical controls and appearances, the present invention can be used to describe logical controls and appearances of elements of a logical control panel. For instance, a logical control panel can be used to control a "black box" not having any physical controls but having only a 1394 connector with the black box being located in a closet or other remote location. In this case, the black box is manipulated with on screen controls via its DDI thereby having no physical control panel itself.

NETWORK ENVIRONMENT OF THE PRESENT INVENTION

FIG. 1 illustrates an exemplary network system 5 that can support the embodiments of the DDI of the present invention. Exemplary system 5 includes consumer electronic devices (including computer systems) as nodes but could be extended equally well to cover other electronic devices. In one embodiment, system 5 is compliant with the HAVi architecture. System 5 includes a video camera 10, a video cassette recorder (VCR) 12, a computer system 14, a set-top-box (STB) 13, a television set (TV) 11 and a compact disk (CD) changer 20 connected together with the network by IEEE 1394-1995 (IEEE 1394) cables 15, 16, 18 and 19. It is appreciated that the DDI embodiments of the present invention are equally well suited for application with any bus structure and the IEEE 1394 bus structure is shown and described herein as an example bus architecture only. The STB 13 can be coupled to receive media from a cable TV system. The IEEE 1394 cable 16 couples the video camera 10 to the VCR 12 allowing the video camera 10 to send data, commands and parameters to the VCR 12 for recording (or to any other device of the network 5). The IEEE 1394 cable 18 couples the VCR 12 to the computer system 14 allowing the VCR 12 to send data, commands and parameters to the computer system 14 for display (or to any other device of the network 5).

The IEEE 1394 cable 15 couples the STB 13 to the computer system 14. The STB 13 is also coupled to the TV 11 by the cable 17. The CD changer 20 is coupled to the TV 11 by the IEEE 1394 cable 19. The configuration 5 illustrated in FIG. 1 is exemplary only and it should be apparent that an audio/video network in accordance with the present invention could include many different combinations of components. The devices within an IEEE 1394 network 5 are autonomous devices, meaning that in an IEEE 1394 network, in which a computer is one of the devices, there is no true master-slave relationship between the computer system 14 and the other devices. In fact, as described below in an exemplary embodiment of the DDI of the present invention, the DDI controller is the STB 13. In many IEEE 1394 network configurations, a computer system 14 may not be present. Even in such configurations, the devices within the network are fully capable of interacting with each other on a peer-to-peer basis. It should be recognized that data, commands and parameters can be sent between all of the devices within the IEEE 1394 network 5.

The IEEE 1394 serial bus used by system 5 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

The IEEE 1394 communication standard within system 5 of FIG. 1 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a VCR 12 to TV 11 of FIG. 1. The VCR 12 records images and sounds and saves the data in discrete packets. The VCR 12 then transfers each packet, representing the images and sounds recorded over a limited time period, during that time period, for display by the TV 11. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible (however, unlike isochronous transfers, with no restrictions on time in transit) and transfer an amount of data from a source to a destination.

DDI CONTROLLER

As described below, the DDI controller is shown as a hardware element. However, it is appreciated that the DDI controller (as well as the DDI target device), within the scope of the present invention, can also be a software element that operates within the hardware platform as described below.

User interface aspects of the DDI of the present invention are implemented within a DDI controller device. The DDI controller can be any device coupled within a networked system (e.g., system 5 of FIG. 1) designated by the user and having certain basic input functionality and basic display capability. In one embodiment of the present invention, the STB 13 and the TV 11 act as the DDI controller. In other embodiments, the computer system 14 can act as the DDI controller or the TV 11 can act alone as a DDI controller. Any device having "display" and input capability can act as the DDI controller, e.g., a personal digital assistant (PDA), a hand-held electronic device, a cell phone, etc.). Within the context of the present invention, the DDI controller is the device that provides a user interface for controlling events on another, remote, DDI target device within the network 5. To this extent, the DDI controller communicates with a display device and an information input device. The display and input capabilities of the DDI controller device define the type of user interface that the DDI controller can provide to a user and the DDI of the present invention allows the definition of scaleable user interface capabilities.

Figure 2:
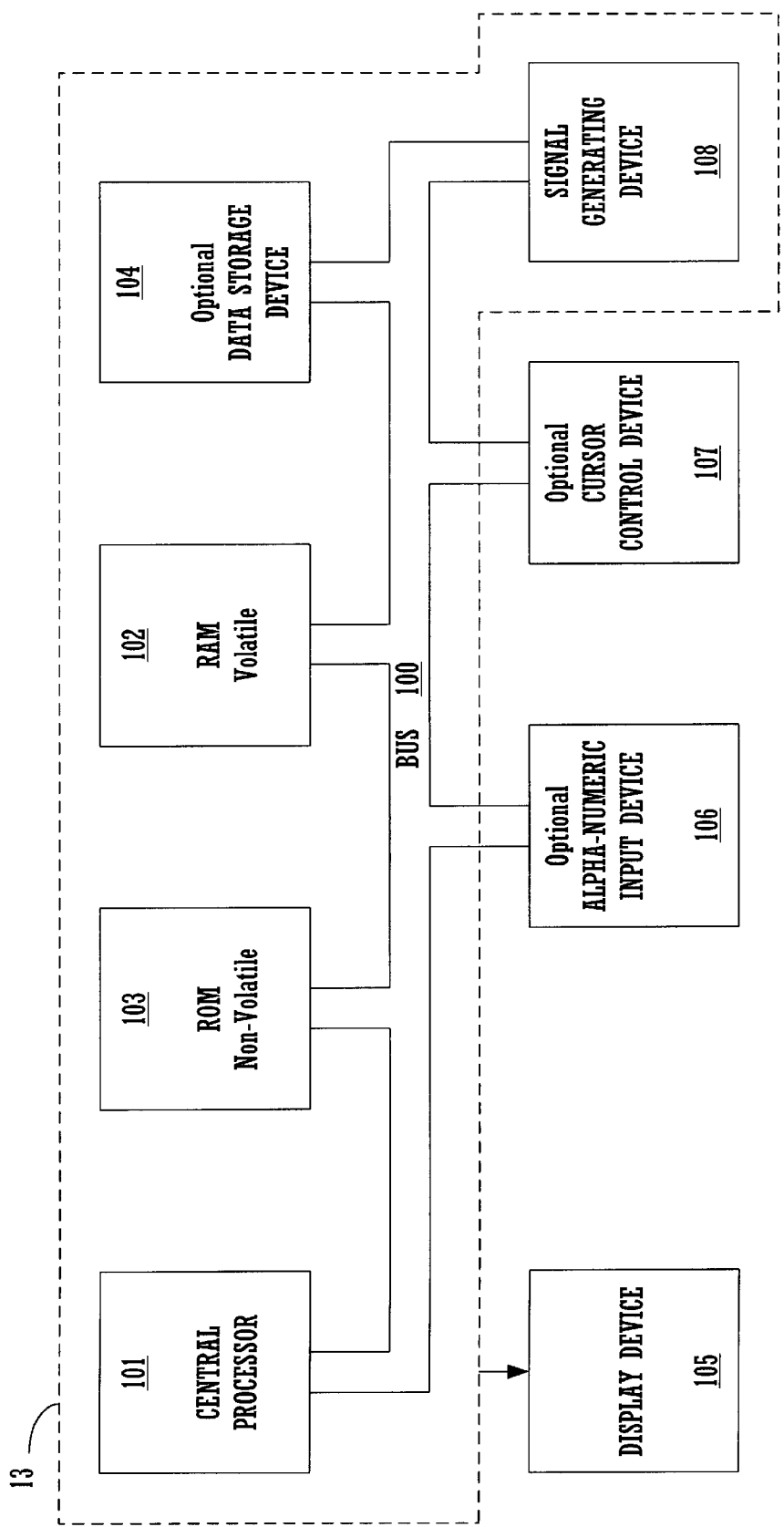
FIG. 2 illustrates exemplary components of a DDI controller device in accordance with the present invention.

FIG. 2 illustrates the components of the DDI controller, and in this example it is the STB 13. STB 13 includes an address/data bus 100 for communicating information, a central processor 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. STB 13 can also optionally include a data storage device 104 ("disk subsystem") such as a magnetic or optical disk and disk drive coupled with the bus 100 for storing information and instructions. In one embodiment, the display device 105 can be part of the DDI controller. As shown in FIG. 2, the display device (e.g.,. TV 11) is external to the STB 13. When incorporated into the DDI controller, the display device 105 can be a display screen (e.g., flat panel or CRT, etc.) or it can be a liquid crystal display (LCD) panel or other suitable display device for the display of alphanumeric and/or graphic information.

The DDI controller 13 also interfaces with or includes one or more user input devices. In one embodiment, the input device can be a button or dial (or toggle or rocker switch) input device 106 which can include alphanumeric and function keys coupled to the bus 100 for communicating information and command selections to the central processor 101. Alternatively, or in addition, the DDI controller 13 can interface with or include a cursor control or cursor directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. In addition, the user input device 107 can also be a remote control device, e.g., a universal remote control device having a number of buttons, dials, etc., with an infra-red signal communication capability. STB 13 can also include a signal generating device 108 ("bus interface") coupled to the bus 100 for interfacing with other networked devices over the IEEE 1394 bus, e.g., line 15 and/or line 17.

The DDI target device of the present invention can exist as a hardware device and in this manner can also include one or more components as described with respect to FIG. 2. Particularly, the DDI target device in accordance with the present invention includes computer readable memory units which can include one or more ROM and/or RAM units for storing DDI information of the present invention which are described below. The DDI target can also be realized as a software element.

DDI SYSTEM OF THE PRESENT INVENTION

Figure 3:
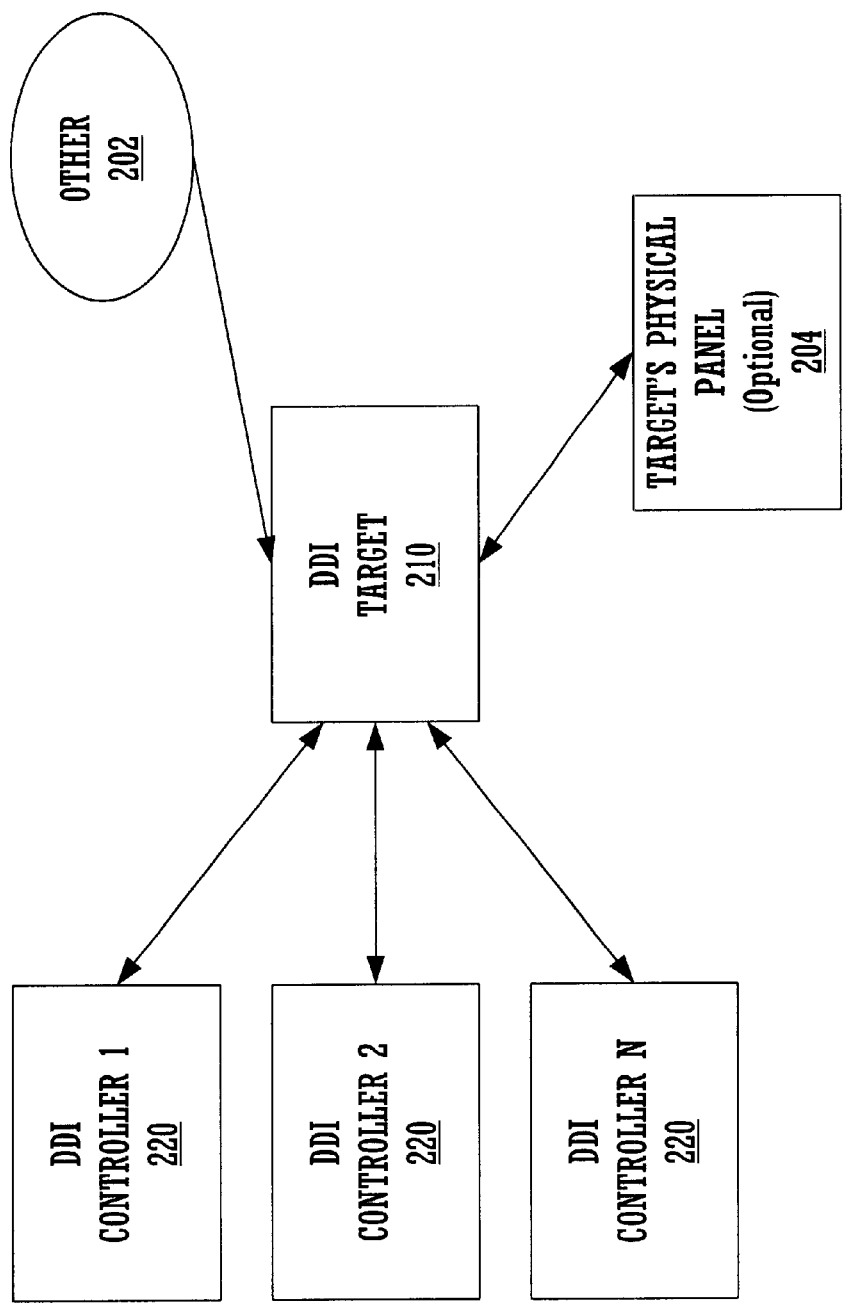
FIG. 3 is a logical diagram of a networked system in accordance with the present invention including one or more DDI controllers and a DDI target device.

FIG. 3 illustrates a logical diagram of a DDI target device 210 being controlled by and communicating with one or more DDI controllers 220. Also shown in FIG. 3 is the DDI target device's own physical control panel 204 (optional) which can also provide control for the DDI target device 210 as well as other third party elements 202. A HAVi software element can provide a user with the ability to control another software element using the HAVi DDI mechanism. Within this interaction, the first software element is termed the DDI controller 220 ("controller") and the second software element the DDI target 210 ("target"). The DDI controller 220 uses a description of the user interface (UI) to be presented to the user. This is called the DDI data and is obtained from the DDI target 210. The means by which this control is accomplished is described herein. More than one logical subunit can exist within a target device 210 (see FIG. 5). Each subunit can be controlled by its own DDI controller 220 therefore multiple DDI controllers 220 can be linked to the same target device 210 as shown in FIG. 3.

Within one embodiment of the present invention, the DDI controller 220 and its DDI target 210 are both HAVi components each executing on an IAV or FAV device. The components may be on the same or different devices, implemented using native code or Java bytecode; in most cases, they interact by sending HAVi messages to each other. The DDI controller 220 communicates with the user by using the input (e.g., 106 and 107) and output devices (e.g., 105) of the platform upon which the DDI controller 220 is executing, e.g., when the DDI controller 220 is a software element. This input/output (I/O) communication can be done in a controller-implementation-dependent manner. The DDI target 210 can be a DCM that controls its device in an implementation-dependent manner. The HAVi DDI protocol is structured so that a DDI controller 220 can be written in a generic manner. That is, a DDI controller 220 does not have to be implemented with knowledge of a particular DDI target 210 in mind; all target-dependencies are represented in the DDI data provided by the target device 210 to the DDI controller 220.

The HAVi DCM, IAV and the FAV elements are described in the following copending patent applications which are all assigned to the assignee of the present invention and hereby incorporated by reference: application Ser. No. 09/003,119, now U.S. Pat. No. 6,032,202, filed on Jan. 6, 1998, entitled "A Home Audio/Video Network with Two-Level Device Control Modules," by Lea and Ludtke; application Ser. No. 09/003,097, now U.S. Pat. No. 6,349,352, filed on Jan. 6, 1998, entitled "Home Audio/Video Network with Both Generic and Parameterized Device Control," by Lea; application Ser. No. 09/003,112, now U.S. Pat. No. 6,052,750, filed on Jan. 6, 1998, entitled "A Home Audio/Video Network with Updatable Device Control Modules," by Lea; and application Ser. No. 09/003,111, now U.S. Pat. No. 6,038,625, filed on Jan. 6, 1998, entitled "Method and System for Providing A Device Identification Mechanism within a Consumer Audio/Video Network," by Ogino and Zou.

The DDI is defined for a DDI target device and outlines characteristics for generating a user interface on the DDI controller 220. The DDI can be defined for multiple DDI target devices and therefore many DDIs can be included within a network system 5. For a particular DDI target device, its DDI can be stored as a data structure within computer readable memory units of the particular DDI target device 210.

Figure 4A:
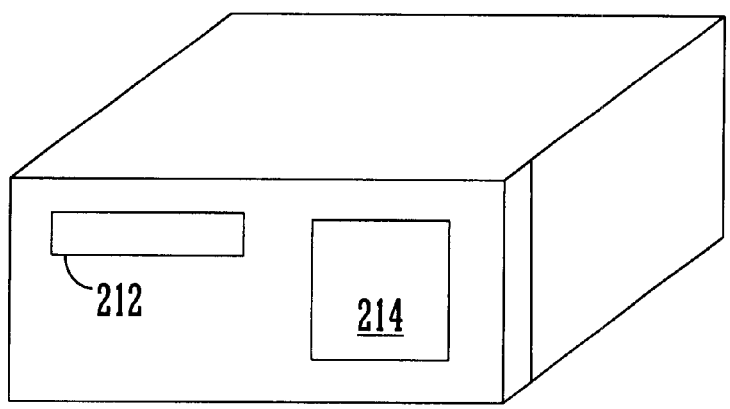
FIG. 4A is a perspective view of a DDI target device having a physical panel display elements and panel control elements.

FIG. 4A illustrates a perspective view of the VCR of FIG. 1 as an exemplary DDI target device 210. Although, generally, any electronic device can have its own DDI and thereby be a "DDI target device," the following discussion illustrates an exemplary case where the VCR is the DDI target device 210. The VCR contains a video tape slot 212 for insertion and removal of video tape media. The VCR also contains one or more liquid crystal displays (LCDs) 214.

Figure 4B:
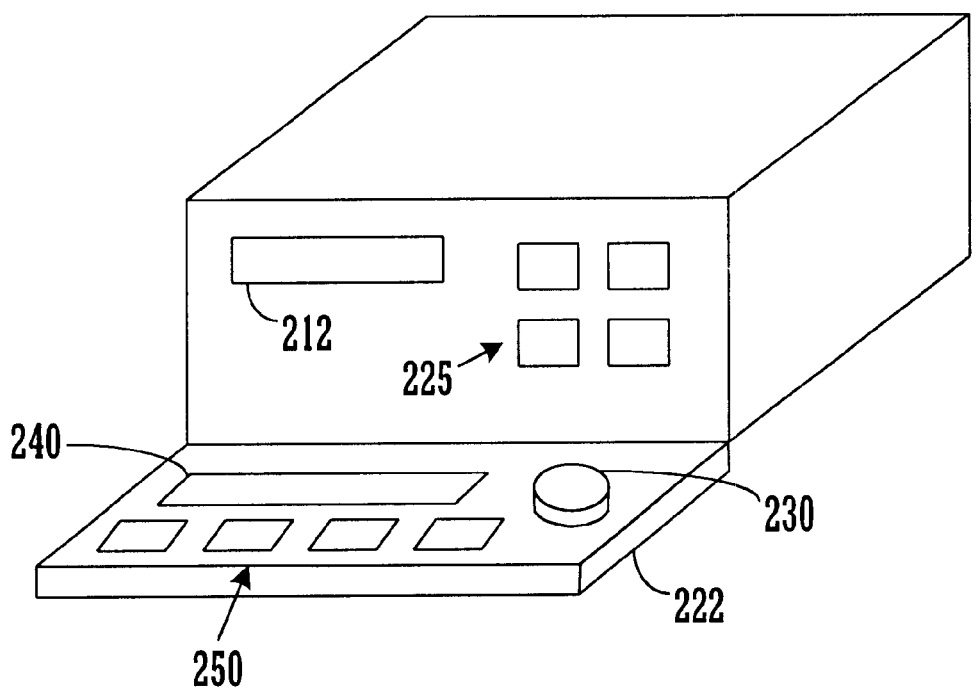
FIG. 4B is a perspective view of the DDI target device of FIG. 4A having a front panel in the flipped-open state to expose more physical control and display elements.

FIG. 4B illustrates the VCR target device 210 with a control panel 220 flipped-down exposing certain controls and further displays (e.g., "elements"). The control panel 222 contains another LCD display 240 and includes a scrubber control 230 or "dial." The control panel 222 also contains certain tape transport controls 250 (including play, pause, stop, rewind, fast-forward, buttons etc.). When the control panel 222 is flipped down, it exposes tuner preset buttons 225. In the present invention, devices can have more than one logical control panel. In this configuration, the VCR has two logical subpanels. The first subpanel includes the controls and display of the flip-down control panel 222 and the second subpanel includes the tape slot 212 and the tuner preset buttons 225. Another subpanel could define the LCD panel 214.

Figure 5:
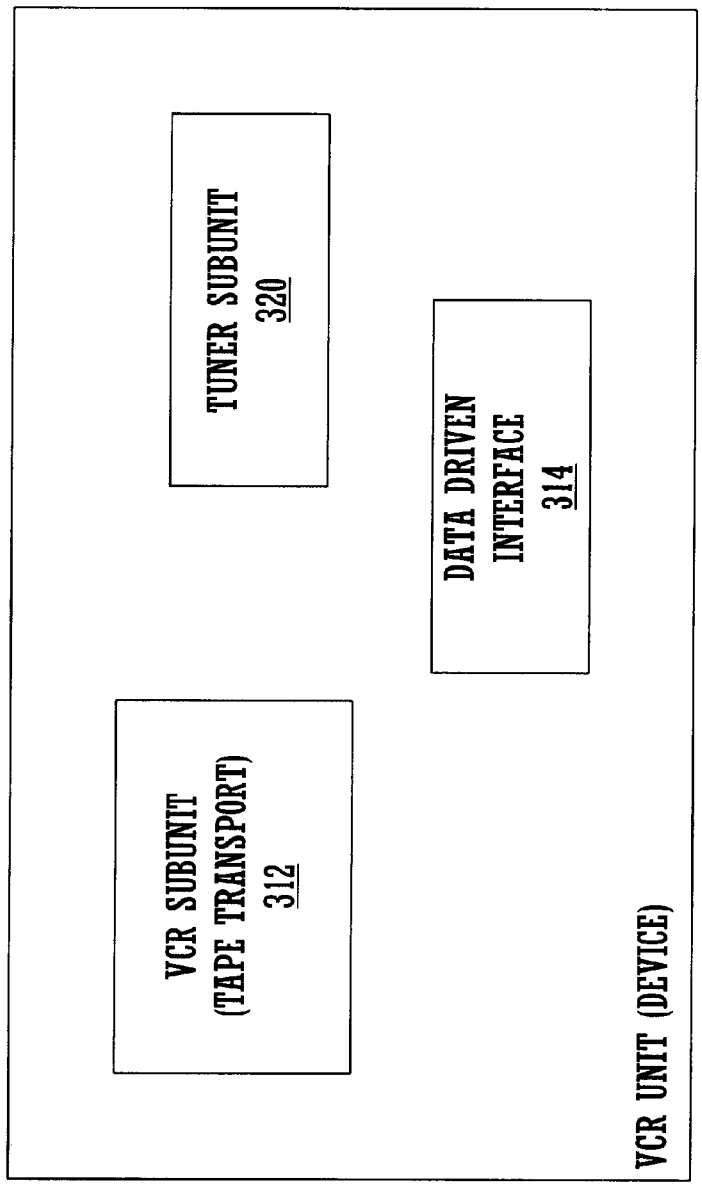
FIG. 5 illustrates a logical block diagram of the logical partitions or "subunits" located within a DDI target device (a VCR) including the DDI of the present invention.

FIG. 5 illustrates a logical block diagram of some of the subunits that can be associated with the VCR target device 210 in accordance with the present invention. Within the well known AV/C protocol, subunits are logical, not physical, groupings of functionality that can be individually addressed and controlled within a device. For example, a VCR device can have two subunits, one subunit 312 for the actual VCR tape transport mechanism, and another subunit 320 for the tuning functionality. The DDI 314 of the present invention adds a novel logical subunit that can be associated with the VCR device. As described further below, the DDI 314 of the present invention is realized, in one embodiment, as one or more data structures stored in computer readable memory units of the DDI target device e.g., the VCR. It is possible for a DDI for a first device (e.g., of limited memory capacity) to exist on a second device (having more memory), whereby the second device acts as a proxy for the first device's DDI.

The DDI 314 is a collection of data structures that describe the physical controls on the DDI target device (e.g., the control panel) 210. In operation, the DDI controller (e.g., STB 13) 220 accesses the DDI 314 of the DDI target device 210, and based thereon, implements a user interface for controlling the DDI target device 210 (e.g., the VCR 12). The user interface involves the display (e.g., TV 11) and user input devices associated with the DDI controller 220. The specification for the DDI 314 defines several standard types of controls and displays that are commonly found on consumer electronic devices, such as push buttons, sliders, dials, LCD screens, etc. As an example, the descriptions within the DDI 314 for VCR 12 could represent the buttons, dial and LCD screens of FIG. 4A and FIG. 4B.

The element types defined by the DDI 314 have well defined behaviors. For instance, buttons are pushed and released and typically have two values, sliders may have several discrete values or a continuous range of values. Further, some standard control types may be combined within the descriptors to form hybrid or custom controls. One example of this is a dial with a push button in the middle or a button with an LED in the middle. Such composite control mechanisms are supported by the DDI of the present invention. Finally, vendor specific custom controls may also be defined.

In addition to standard control types, the DDI 314 of the present invention also defines a set of commands which may be applied to any of these controls. The commands are defined to be sufficiently generic so that they apply to most types of controls. For example, issuing the command SET CONTROL VALUE (control 1, 6) by the DDI controller 220 may cause a volume slider to be set to the value 6, representing a change in volume. Likewise, the same command type with different operands can be issued as SET CONTROL VALUE (control 5, "please enter the track name"), and it would cause that text to show upon the LCD display of a MiniDisc recorder 20, prompting the user to enter a name for a track on the disc. Further, within the DDI, some commands can be specific to certain kinds of controls.

The DDI 314 also defines "user events" which can be applied to the controls of the user interface. The purpose of these generic user events is to encapsulate the typical user manipulation actions for controls, and to let the DDI target device interpret what it means when these user events occur thereby freeing the DDI controller 220 of this responsibility. For example, many CD players 20 have multiple semantic meanings for the fast forward button on the device and these meanings are affected by the current state of the device. Consider the following:

TABLE I

| Current Device Setting | Action | Result |
| --- | --- | --- |
| Device Is Not Playing | FF Button Pressed | Advance to the Next Track and Hold |
| Device Is Playing | FF Button Pressed | Advance to the Next Track and Continue Playing from that Point |
| Device Is Playing | FF Button Pressed and Held Down | Play in "Fast Forward" Mode |

As shown above, the actions taken by the DDI target device vary based on its current state and what the user does with the physical controls. The DDI of the present invention defines several user action commands such as "PUSH," "PRESS AND HOLD," and "RELEASE" that are triggered by user interaction with the displayed user interface. In accordance with the present invention, the DDI controller 220 of the present invention has no notion of what the DDI target device will do in response to the commands that are issued to it. All concerns regarding a the state transition as shown in the Table I are handled inside of the DDI target device. It is appreciated that the DDI target device already needs to have this logic in place in order to process the user interaction on its physical control panel. The DDI of the present invention is viewed as another mechanism by which to access these logical entry points.

It is important that the DDI controller 220 keeps the user informed regarding the status of the DDI target device being controlled. In one embodiment, it is possible that the DDI controller 220 and the user are sitting in one room of a house or business office and the DDI target device is located in another room or office. Because the DDI controller 220 has no pre-defined knowledge of how to interpret the user interaction elements, it needs to have a mechanism of keeping its display updated with the most current status of the DDI target device. It does this by making use of a status reporting mechanism including status notification messages in accordance with the present invention.

The status information of the target 210 is dynamic and is represented in an internal data structure that is kept up-to-date by the DDI 314 of the present invention. The DDI target can send status updates to the DDI controller upon state changes. Alternatively, the DDI controller 220 can examine this structure at any time so that it can update its graphical display to indicate the DDI target device status to the user. A status notification command allows the DDI controller 220 to post a notification request to the DDI target device. When any change in the state of the device results in a change to the status descriptor data structure, then the DDI target device sends a notification to the DDI controller 220. The DDI controller 220 then updates its graphical display as appropriate in response to the status information.

Part of the DDI data structures includes geometry information describing the layout image and orientation of panels and controls so that they can be represented to the user in a manner similar to their physical appearance on the DDI target device or in a manner "suggested" by the DDI target device. As standard controls can be combined into hybrid controls, this geometry information can also be defined to indicate the presence of panel hierarchies, such as panels hidden behind a front flip-down face 220 (FIG. 4B). This is commonly found in many VCR devices where some basic controls are on the face of the VCR device and the more advanced controls and features are hidden behind the flip-down front panel 220.

DDI MESSAGE SEQUENCE PROTOCOL

Figure 6:
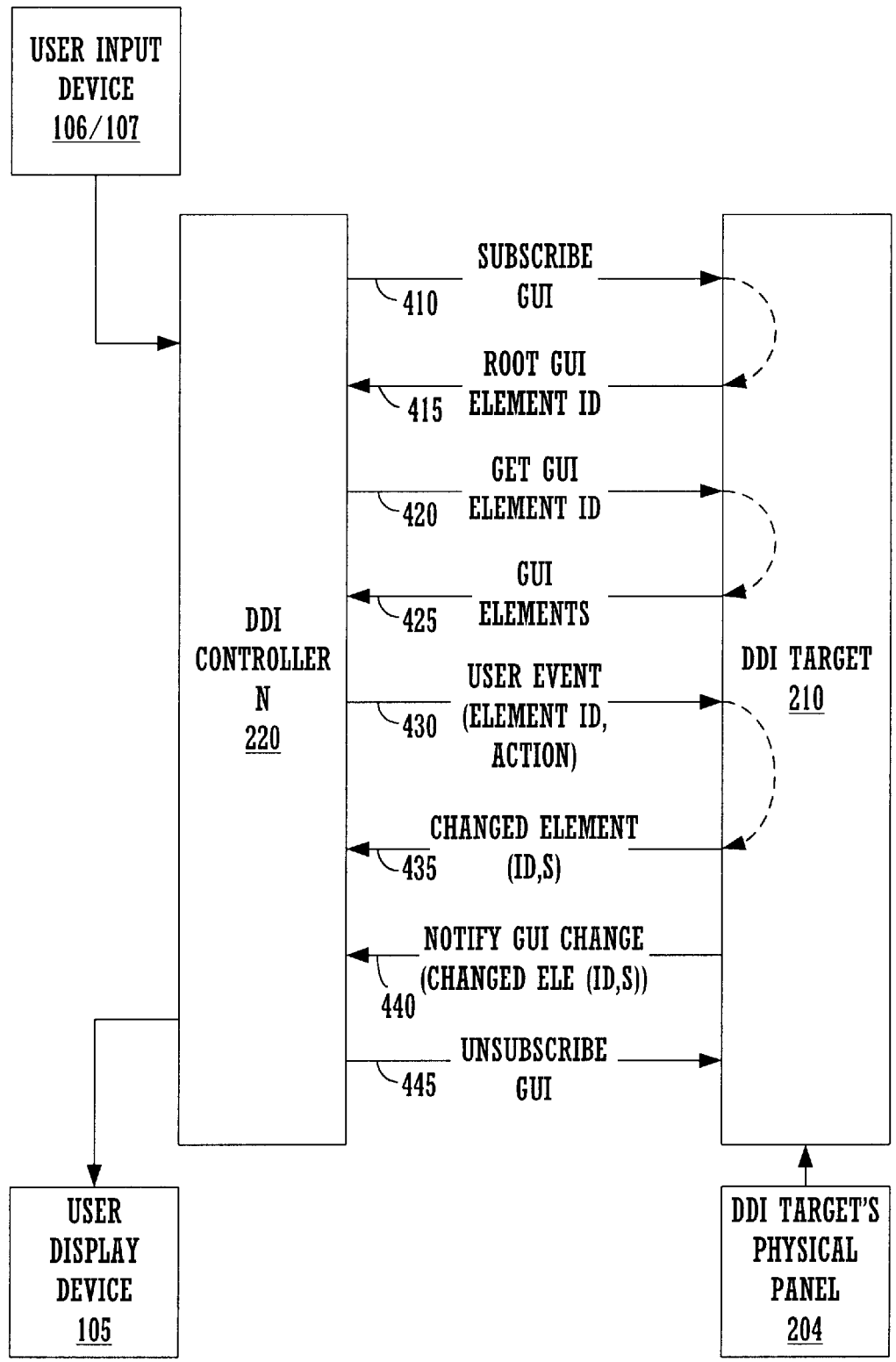
FIG. 6 is an illustration of the communication interface between a DDI target and a DDI controller in accordance with the present invention.

FIG. 6 illustrates the DDI message sequence protocol of the present invention between a particular DDI controller 220 and a particular DDI target 210. The messages can be represented by APIs (application programming interfaces), examples of which are described further below. Any of a number of well known locator procedures can be used for the DDI controller 220 locating its particular DDI target 210 or vice-versa. Controller-target interaction starts with the DDI controller 220 sending a message, e.g., a SubscribeGui message 410, to the target 210. The DDI target 210 records which software element sent this message 410 for use in possible NotifyGuiChange messages 440 which are described below. The DDI target 210 also returns the name of an initial (or root) GUI element using response message 415. The DDI controller 220 uses the GetGuiElement 420 message with this name as an argument to obtain the complete contents of the root GUI element for rendering on the controller's display device. GUI elements represent the display of the GUI that the DDI controller 220 renders and may include images and/or text describing buttons, sliders, LCD displays, menus, etc., depending on the defined DDI of the target 210.

Thereafter, based on user input (e.g., from 106 and/or 107), the contents of the controller's display device 105, and the GUI element(s) the DDI controller 220 obtained from the target 210, the controller can (1) change the information that is being displayed to the user using a controller implementation-dependent mechanism, (2) ask the DDI target 210 for another GUI element using the GetGuiElement message 420 (with the name of the desired GUI element as an argument) or (3) send a control command (determined by the contents of the GUI element and possible user input) to the target using the UserAction message 430 of FIG. 6.

At any time after a DDI controller 220 has subscribed to a DDI target 210 and before that DDI controller 220 has unsubscribed to that target 210, the DDI target 210 can indicate that the GUI description held by the DDI controller 220 has changed. This can indicate, for example, that some aspect of the target's internal state which is relevant to the user has changed. The indication is done by the DDI target 210 sending a NotifyGuiChange message 440 to the DDI controller 220. Arguments to this message 440 provide the DDI controller 220 with information about which parts of the target's GUI description have changed.

A UserAction message 430 sent to the DDI target 210 by the DDI controller 220 returns to the DDI controller 220 information about those parts of the targets GUI description that have changed as a direct result of the action. For example, a GUI button hit can attempt to place a target device 210 into a rewinding mode and the DDI target 210 may wish to indicate the success (or failure) of the command by returning (via response 435) a text element with an appropriate string value or a graphic image of the result. In this manner, the user and the target device 210 communicate with each other using a sequence of messages sent between the DDI controller 220 and the DDI target 210 guided by the DDI data the controller obtains from the target 210.

When the DDI controller 220 is done with the interaction with a target 210, it sends an Unsubscribe message 445 to that target 210. The DDI target 210 thereafter does not send NotifyGuiChange messages 440 to that DDI controller 220 and the DDI controller 220 does not send any other messages to that target 210. The DDI controller 220 is able to open a new interaction by sending another SubscribeGui message 410 to that target 210. In addition to the GetGuiElement message 420 (which takes as an argument the name of a single element and returns the actual element with that name) a DDI target 210 also provides a number of other similar messages for efficiently returning lists of element names or lists of actual elements which are described further below.

Because the HAVi DDI mechanism is primarily intended to allow users to interact with devices, the DDI controller 220 that pulls the GUI description functions essentially as a UI-controller. The DDI target 210 that supplies the GUI description is typically a HAVi device control module (DCM). However, it is possible for any application (not only a UI-controller) to act as a DDI controller 220 and for any application (not only a DCM) to act as a DDI target 210 within the present invention. It is also possible for a DDI target 210 to be controlled by more than one DDI controller (as shown in FIG. 3) and for a DDI controller 220 to control more than one DDI target 210. The DDI data used by the DDI controller 220 need not have come from the DDI target 210 being controlled, however, typically it will come from the target 210. Any DDI data that is supplied by a DDI target 210 is generally always appropriate for controlling that target.

INPUT/OUTPUT DEVICE MODELS

User Output and Input Device Models. The DDI controller 220 manages in an implementation-dependent manner a display device 105 to communicate to the user and a user input device 106/107 to accept commands from the user. In order to allow the DDI model to apply to a broad range of particular devices these devices are modeled abstractly by only specifying in a general manner the way in which DDI data is associated with physical user interaction. The DDI data and its constituent GUI elements provide guidelines on how the DDI controller 220 is to make this association. These guidelines depend on the type and attribute values of the GUI elements.

Output Device Model. The GUI elements that the DDI controller 220 obtains from the DDI target 210 can be physically presented, rendered, to the user using the display device. Each GUI element is of a particular type (e.g., panel, icon, button) and each type of GUI element has a particular set of attributes (e.g., size, position, color, image content, audio content). All attributes are divided into two distinct classes: mandatory attributes and optional attributes. In a target's DDI data, the mandatory attributes of a GUI element generally have an associated value and optional attributes may or may not have an associated value. Every GUI element type has one or more mandatory label attributes whose values are text strings.

The DDI takes into consideration that there are three broad classes of display devices. The first class is the Full Capability Devices (e.g., high resolution display screen with computer system). These devices can render all GUI elements exactly as described within the DDI of the DDI target 210 taking into account the values of all supplied attributes be they mandatory and optional alike. The second display class is the Scaled-Down Devices. These devices that can render all GUI elements taking into account the values of all mandatory attributes but only some or even none of the values of optional attributes (e.g., small display screen devices). The third class is the Text-Only Devices (e.g., some liquid crystal displays). These devices that can only render text strings and take into account only the values of mandatory label attributes.

The DDI controller 220 is also responsible for physically presenting the values of audio attributes of GUI elements as best as it and its display device are able to render. Many GUI element types have attributes that are to be used by the DDI controller 220 to determine position and size on the display device.

Figure 7:
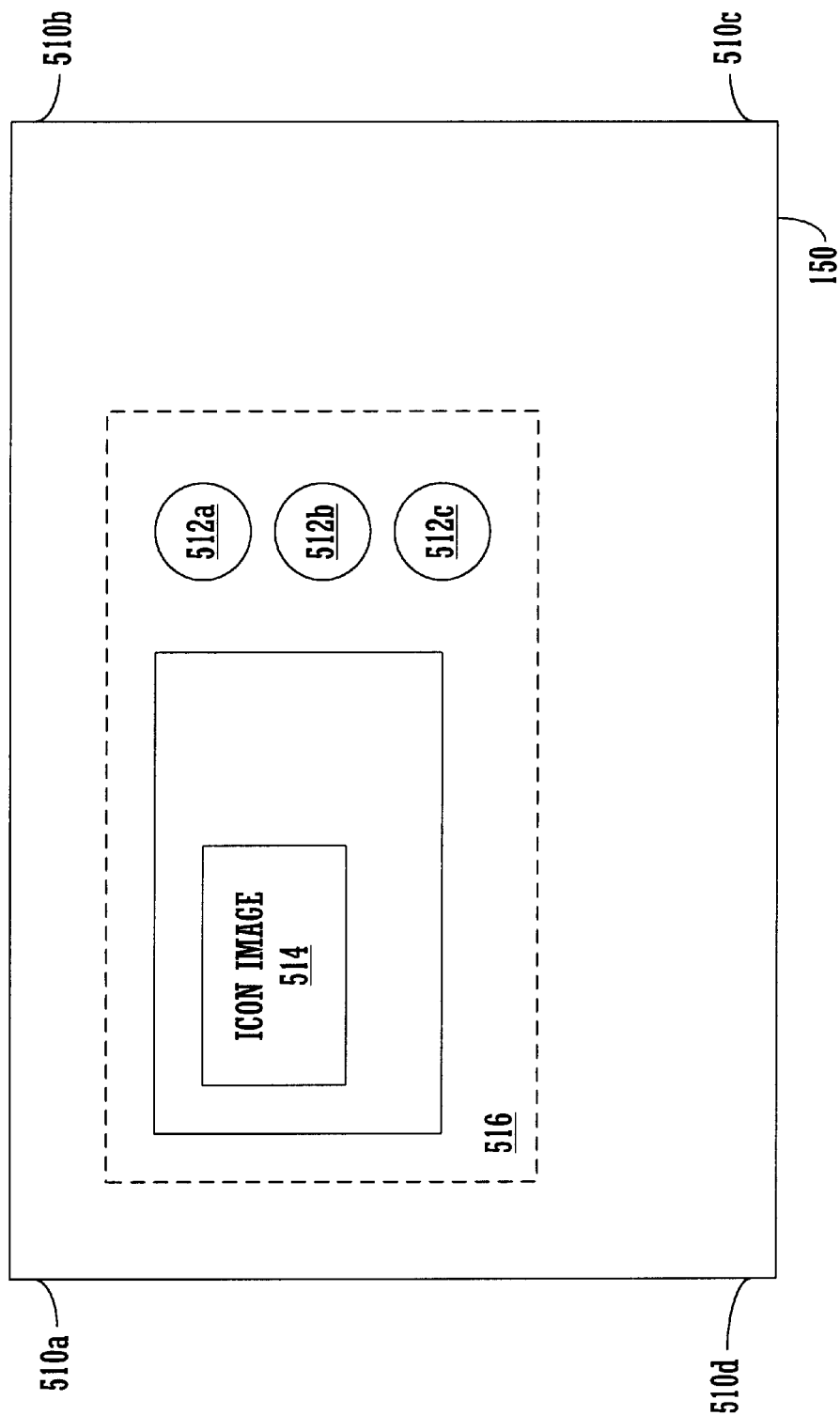
FIG. 7 is a diagram illustrating an exemplary GUI displayed on a DDI controller in response to a target's DDI defined in accordance with the present invention.

As shown in FIG. 7, the physical display device 150 (see also FIG. 2) is considered to be a rectangular array of discrete pixels. Position and size information is expressed with respect to a two-dimensional coordinate system for this rectangle with non-negative x and y coordinate values. The upper-left corner 510a of FIG. 7, as the user faces the device, is <0,0> coordinate. The lower-right corner 510c is <MAX_X, MAX_Y> coordinate, where MAX_X and MAX_Y are defined herein below. The positions of GUI elements contained within organizational GUI elements (that is, panel and group elements) are relative to the position of the most immediately containing organizational element. The values that pixels may have and the physical interpretation of the value (e.g., color) are also defined herein below. For many types of GUI elements, attributes that specify their position are optional. When a position attribute is not given for an element, the DDI controller 220 has broad freedom to locate the rendering of that element subject only to the guidelines provided by the place of that element within the overall DDI data of the present invention.

Also shown in FIG. 7 are representations of GUI elements. Several buttons 512a–512c are shown as well as an icon image 514. These GUI elements are all within a logical element grouping 516.

Input Device Model. Like output to the user, input from the user is modeled generically in accordance with the present invention. In order to present this model, a number of definitions are presented. GUI element types are interactive (e.g., button, set range) or non-interactive (e.g., status), based upon whether they, respectively, can or cannot be used by the DDI controller 220 to send a UserAction message 430 (FIG. 6) to the target 210. GUI element types are user-modifiable (e.g. set range) or non-user-modifiable (e.g., button, icon) depending upon whether they, respectively, have or do not have a user-modifiable attribute.

User input is taken into account within the DDI model of the present invention by requiring that a DDI controller 220, in a manner appropriate for the actual physical input device (106, 107), allow the user to perform a number of actions. The user can change the value of a user-modifiable attribute of a user-modifiable GUI element (e.g., enter a new text string into a GUI entry element). The user can select an interactive GUI element (e.g., hit a GUI button element) causing the DDI controller 220 to send a UserAction message 430 to the DDI target 210 with arguments whose values depend on the type of the GUI element and on the particular kind of selection the user performed. The user can also explicitly associate with the display device another GUI panel element by selecting a GUI panel link element. This only affects the display device and it does not directly cause the DDI controller 220 to send a UserAction message 430 to the target 210. This can, however, cause the DDI controller 220 to obtain more GUI elements from the target 210.

The display device can be changed by having the DDI controller 220 render GUI elements that are associated with the current GUI panel element but which are not currently rendered. This change only affects the display device and it does not directly cause the DDI controller 220 to send a UserAction message 430 to the target 210. If display resources are otherwise inadequate to render the new GUI elements, the DDI controller 220 may render GUI elements in a manner of its own choosing. For example, the DDI controller 220 may remove an arbitrary element from the current display or allow the user to control a scrolling mechanism.

GUI ELEMENTS OF THE DDI

Organizational GUI Elements. The GUI elements contained in a target's DDI data are arranged into a hierarchy in accordance with the present invention. This hierarchy serves three purposes. First, it allows a DDI controller 220 to navigate through the GUI elements in an organized way. Second, from the target's point of view, it indicates which GUI elements belong logically together and should, therefore, preferably be displayed physically together to the user. Third, from the controller's point of view, it can be used to let the DDI target 210 know about which GUI element changes the DDI controller 220 should be notified.

Figure 8A:
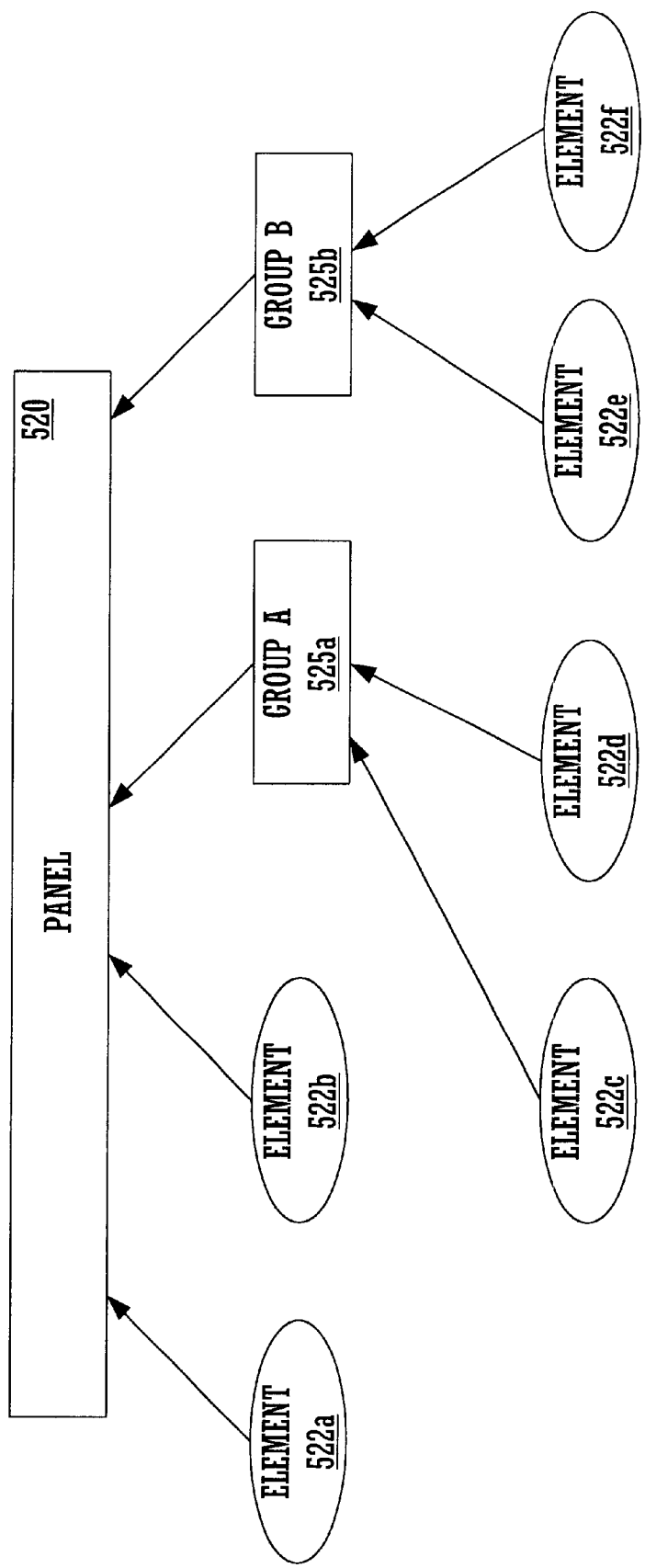
FIG. 8A illustrates an exemplary generic DDI hierarchy, including panels, objects and non-organizational GUI elements, defined in accordance with the present invention.

FIG. 8A illustrates an exemplary hierarchy including two types of organizational GUI elements that determine the hierarchical organization of the elements in a target 210's DDI data. The first type is the GUI panel element 520, which has a (mandatory) attribute whose value is a list of the names of the GUI elements that are contained in the panel. GUI panel elements may not be (directly) contained in other GUI panel elements. The second type is the GUI group element 525a–525b, which has a (mandatory) attribute whose value is a list of the names of the GUI elements that are contained in the group. GUI panel and group elements may not be (directly) contained in other GUI group elements. Both panels and groups can contain non-organizational elements, shown in FIG. 8A as "elements" 522a–522f.

Panel and group elements are non-interactive and non-user-modifiable in the sense defined with respect to the input device model. A non-organizational GUI element is defined to be an element that is not an organizational GUI element. Non-organizational GUI elements are discussed below.

Non-Organizational GUI Elements. At any point in time, a DDI controller 220 has a current panel which is the GUI panel element that the DDI controller 220 has most recently obtained from the DDI target 210 and which the DDI controller 220 is currently rendering to the best of its abilities (with all its contained GUI elements) on the display device. The DDI controller 220 allows the user to navigate through the current panel's contents by means of the above described hierarchy. The DDI controller 220 can choose to render panels, groups within panels and non-organizational GUI elements within panel or groups.

The way in which a DDI controller 220 navigates through the panels and groups is its choice. The only thing that a DDI target 210 can assume is that the user is aware of the panel and the group that contains any GUI element the user may select. The DDI controller 220 (depending on the capabilities of its display device) can assure this in a number of ways. First, by displaying the complete panel, all its groups with all their non-organizational GUI elements. Second, it can assure this by displaying for the panels and groups only their label or icon. Third, it can assure this by displaying the non-organizational GUI elements only. In this case, the DDI controller 220 can still assure that the user knows what he/she is looking at, because he/she steered the navigation through the panels, groups, and GUI elements in a particular way as known to the user. Lastly, some combination of the above can be used.

Uses of Organizational GUI Elements. A GUI panel element (and its contained elements) can be used for the presentation and control of a function or a very closely related set of functions in the DDI target 210 device. The panel 520 (FIG. 8A) represents a set of GUI elements which the DDI controller 220 should render together on a single display screen. If this is not possible, the DDI controller 220 may divide/modify the set of panel elements over as few display screens as display capability allows. The user is allowed to navigate through these displays. However, this must be done in a manner consistent with the intention of the designer of the DDI target 210 DDI data that the user considers this set of elements as comprising a whole.

Similarly, a GUI group element 525a–525b can be used for the presentation and control of a sub-function of the DDI target 210 device. The elements contained in the group all have the same level of display priority. In situations where the DDI controller 220 cannot render all the groups and other elements in a panel at the exact positions specified by their attributes, the controller 220 can move or choose to (temporarily) not render some groups or other elements. However, the DDI controller 220 makes a strong attempt to keep the elements in a group together when they are rendered. The groups within a panel have a linear ordering of their priorities. The DDI controller 220 when deciding where to position groups and their contained elements or which groups to temporarily not render should favor groups of higher priority.

Like the panel and group elements which may contain them, non-organizational GUI elements may have position information supplied by their attributes. If display resources are limited, the DDI controller 220 may change the position of non-organizational GUI elements within their panel or group.

Non-Organizational GUI Elements. As defined above, non-organizational GUI elements are those GUI elements that are not panel 520 or group 525a–525b elements. These types of GUI elements occupy leaf device positions in the GUI hierarchy determined by panel and group elements. A non-organizational GUI element has mandatory and optional attributes that suggest to the DDI controller 220 how the element should be rendered and what sort of effect user input should have upon the element, e.g., is the element user-modifiable with respect to the input device model. The attributes also describe what effect user selection should have with respect to the DDI controller 220 sending User-Action messages 430 to the target 210, e.g., is the element interactive in the sense defined in the input device model.

What follows is a description of an exemplary subset of non-organizational GUI elements mentioning important mandatory attributes, indicating its use and typical renderings, and categorizing it with respect to interactivity and user-modifiability.

The "text element" has a mandatory attribute containing a text string. This element is used to present a static label or other textual information to the user. This element is Non-interactive and non-user-modifiable. The "panel link" element has a mandatory attribute containing the name of a panel element. This element is used for user-driven navigation by the DDI controller 220 and is noninteractive and non-user-modifiable. This GUI element can be used to direct a user back to a main screen or menu item. The "button element" has mandatory attributes that describe a sequence of pressed and unpressed appearances. This GUI element is used to allow a user to send a simple (e.g., without parameters) command to the DDI controller 220 and is interactive and non-user-modifiable.

The "choice element" has mandatory attributes that describe a discrete set of possible values of which the user may choose one or a number and thereby indicate to the DDI target 210 some command or course of action. Typical renderings are as many-out-of-many choice boxes or as one-out-of-many radio buttons. This element is Interactive and user-modifiable. The "entry element" allows a user to enter a text string value and send it to the target 210. A typical rendering is as a text entry field with an optional associated on-screen keyboard. This element is interactive and user-modifiable. The "animation element" has a mandatory attribute containing a sequence of icons. If there is only one icon in the sequence, that icon is statically rendered by the DDI controller 220. If there is more than one icon in the sequence the DDI controller 220 renders each icon in temporal sequence giving the user the effect of an animation. This element is interactive and non-user-modifiable.

The "show range element" has mandatory attributes defining a numeric range and a particular value within that range. This element is used to present static numeric information to the user. Typical renderings are as a circular meter with variable position pointer or as a linear variable length bar. This element is non-interactive and non-user-modifiable. The "set range element" has mandatory attributes defining a numeric range. This element is used to allow a user to send a command with a numeric parameter to the target 210. Typical renderings are as a slider or dial and this element is interactive and user-modifiable.

The actual appearance and position of each GUI element depends on the DDI controller 220. For instance, while a target's DDI data provides an explicit logical structure for its GUI elements, it only gives suggestions to the DDI controller 220 for their rendering.

Figure 8B:
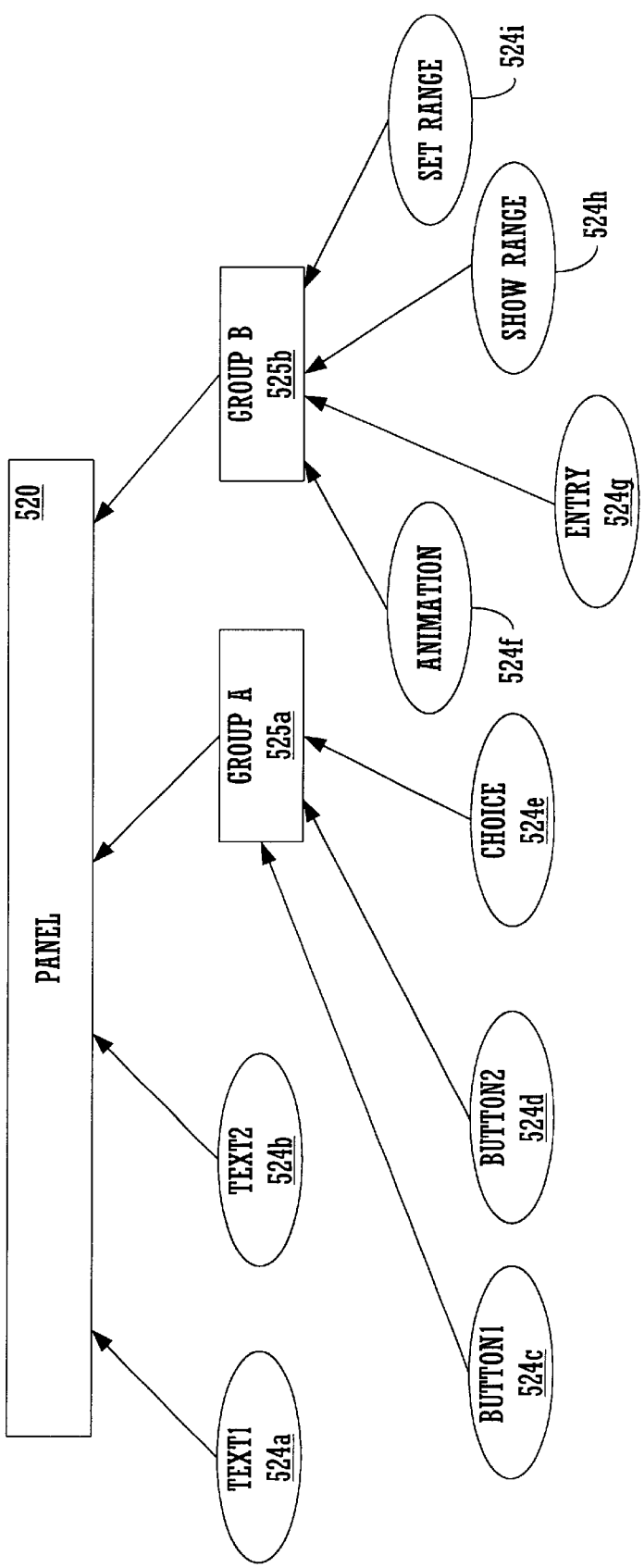
FIG. 8B illustrates an exemplary specific DDI hierarchy, including panels, objects and specific non-organizational GUI elements, defined in accordance with the present invention.

FIG. 8B illustrates an exemplary hierarchy using the above defined GUI elements. In this exemplary structure, panel 520 directly includes two text GUI elements 524a and 524b. Group 525a includes two button GUI elements 524c and 524d and also a choice GUI element 524e. Group 525b includes an animation GUI element 524f, an entry GUI element 524g and a show range GUI element 524h and a set range GUI element 524i.

PROCESS FLOW FOR DDI INTERACTION

Figure 9A:
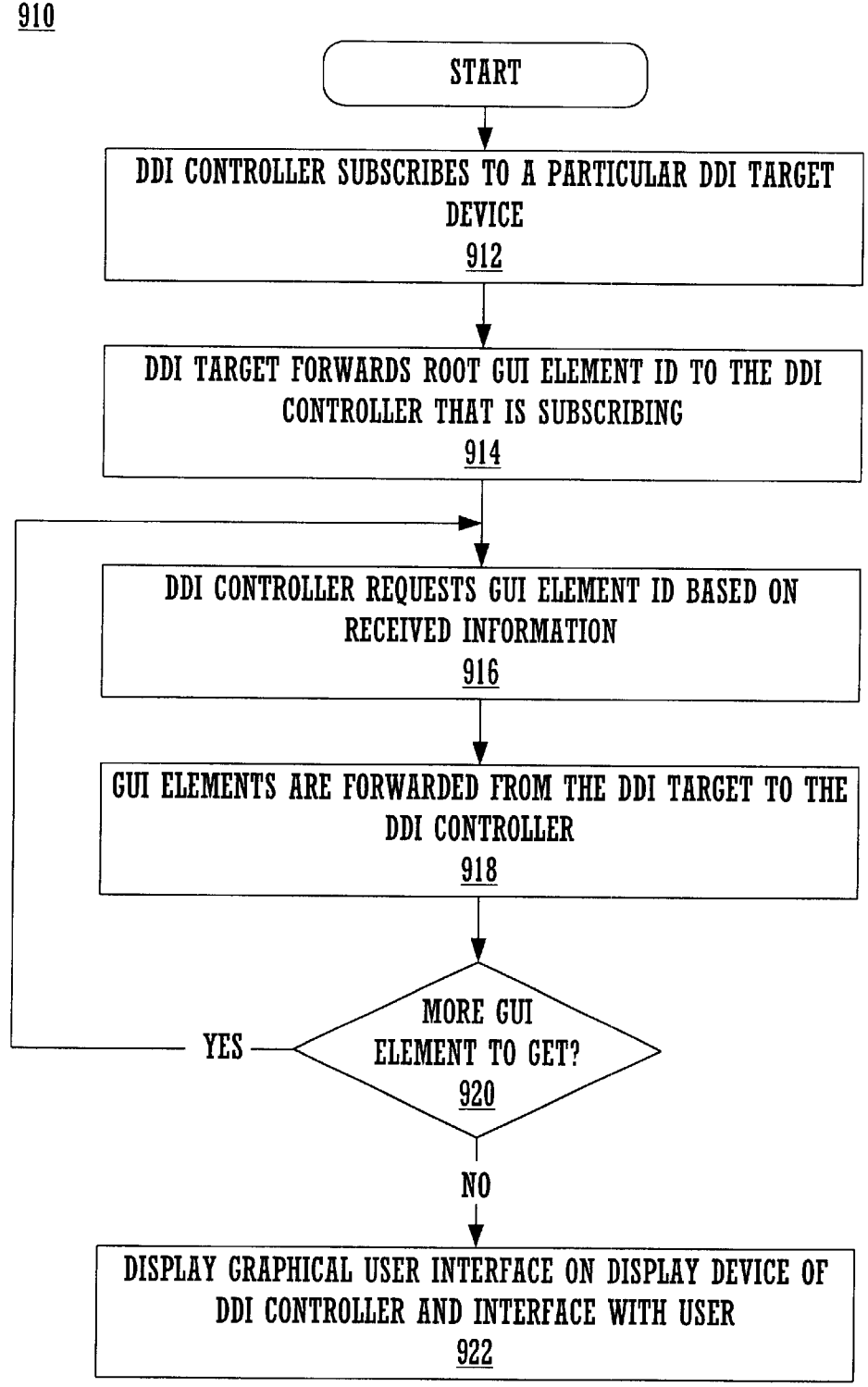
FIG. 9A is a flow diagram illustrating a process used by a DDI controller and a DDI target for rending a GUI on the DDI controller in response to the target's DDI.
Figure 9B:
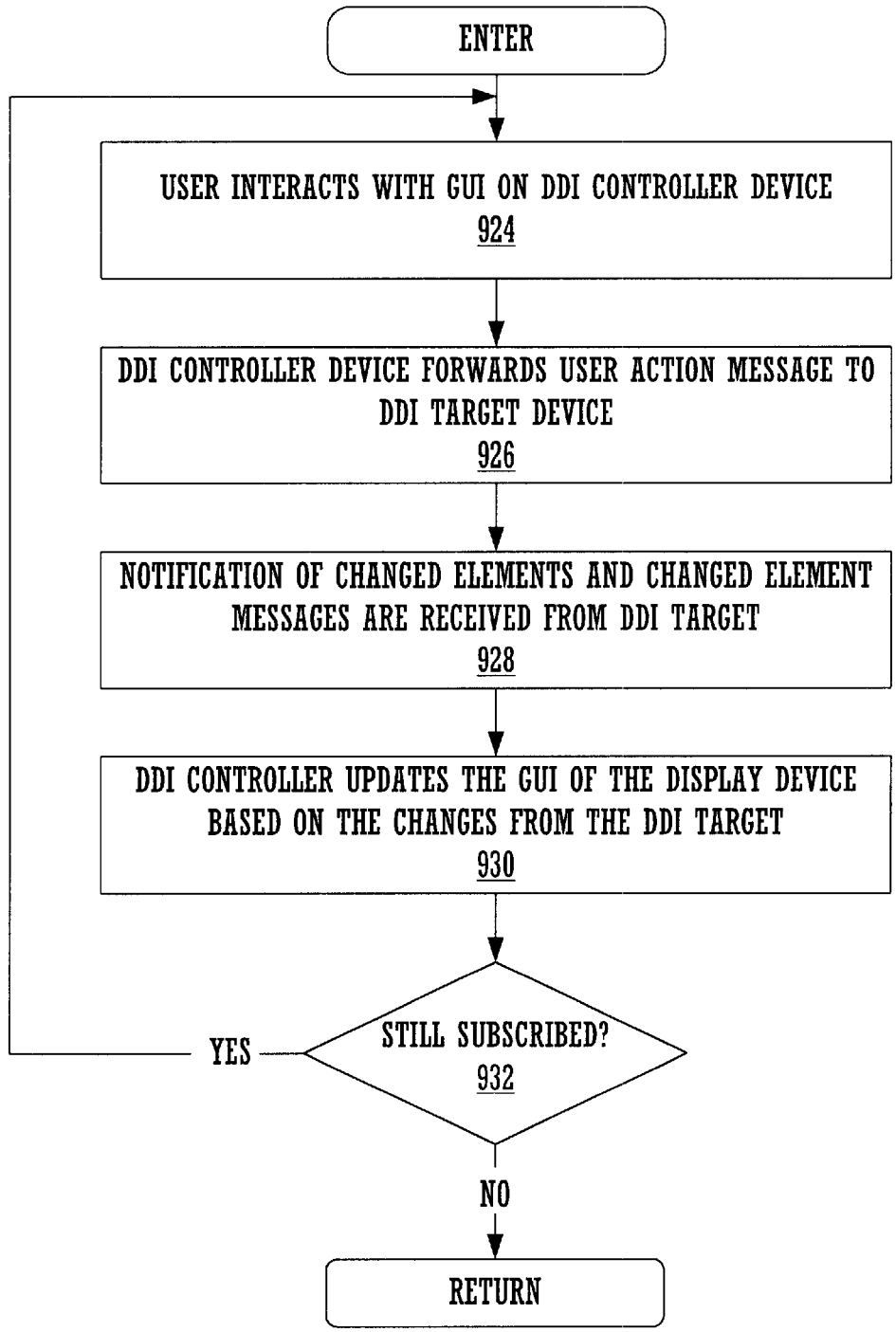
FIG. 9B is a flow diagram illustrating the steps performed by the DDI controller of FIG. 9A in response to a user interaction with the controller's GUI and in response to the DDI target's state change messages.
Figure 9C:
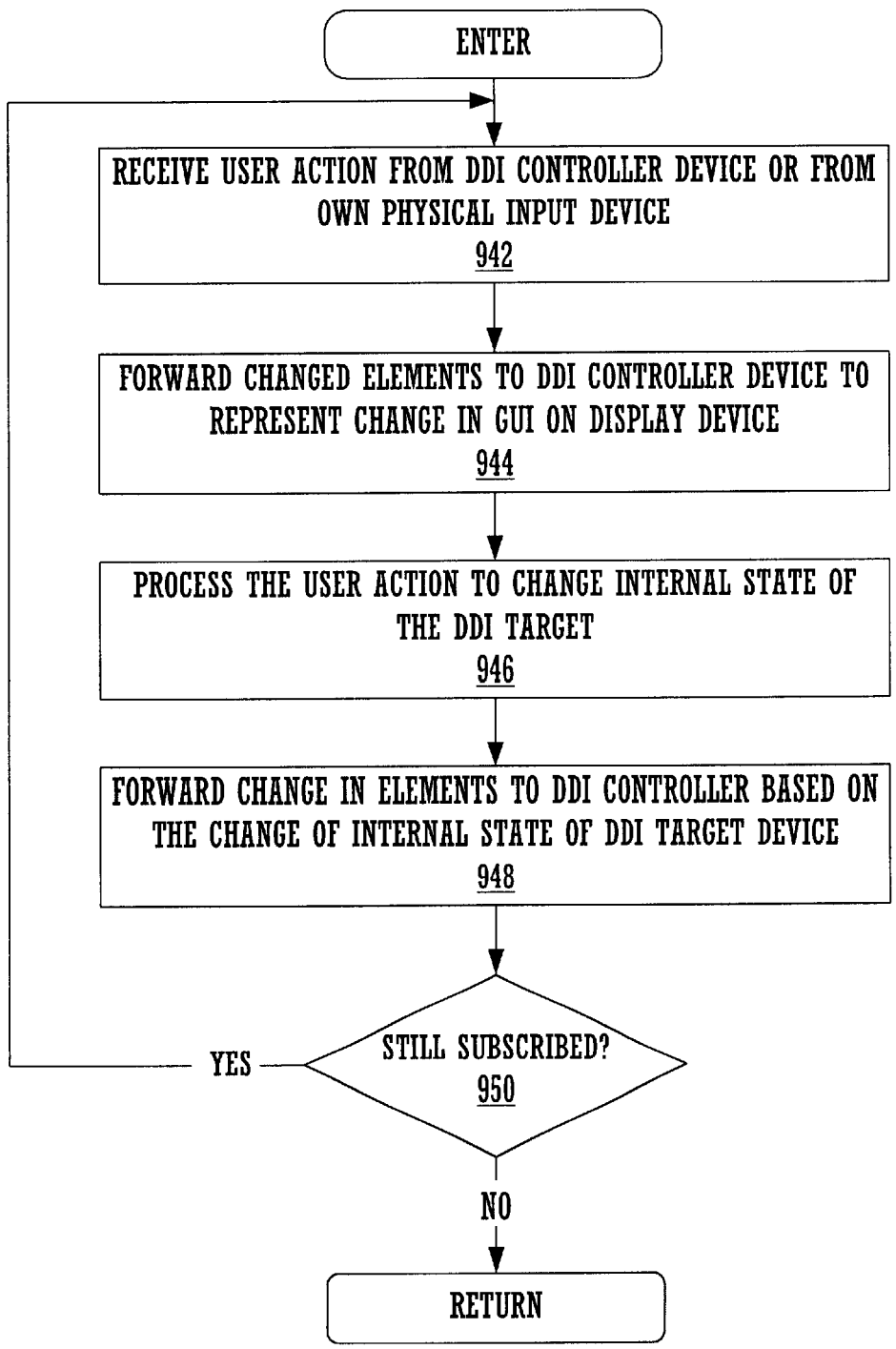
FIG. 9C is a flow diagram illustrating the steps performed by the DDI target of FIG. 9A in response to user event messages from the DDI controller and in response to interaction with the target's own physical input device (if present).

FIG. 9A, FIG. 9B and FIG. 9C illustrate the high level steps of the process flow of the DDI interaction between a DDI target 210 and a DDI controller 220 in accordance with one embodiment of the present invention. These steps are realized as program code stored in computer readable memory units of computer systems and are executed by processors.

Process 910 of FIG. 9A commences at step 912 where a DDI controller 220 subscribes to a particular DDI target 210 using the subscribe GUI message 410 of FIG. 6. Once subscribed, the DDI target 210, at step 914, forwards the root GUI element identification of its DDI hierarchy to the subscribing DDI controller 220. From steps 916 and 918, and based on the root element identification, the DDI controller 220 can walk through the DDI hierarchy thereby requesting leaf GUI elements and other organizational GUI elements (e.g., panels and objects) as described herein. At step 916, GUI element identification requests 420 are made of the DDI target 210. At step 918, GUI elements are forwarded to the DDI controller using messages 425. At step 920, this continues until the GUI is downloaded from the DDI target device 210 to the DDI controller 220.

At step 922 of FIG. 9A, a representation of the graphical (or textual) user =interface that is described by the downloaded DDI is rendered on the DDI controller 220. The representation depends on the display capability of the DDI controller 220. The user is thereby allowed to interface with the DDI as rendered on the DDI controller 220. Process 922 is described in more detail in the below section "DDI Controller Presentation."

Process 922 is also described in more detail in FIG. 9B and is described from the point of view of the DDI controller 220. At step 924, the user interacts in some way with the user interface devices of the GUI of the DDI controller 220. This can include pressing a button, moving a dial, pressing a remote control button or knob, switching a toggle, interfacing with a gauge, typing in a number, moving a rocker switch, interfacing with a displayed graphic or textual information of a display screen, entering an audible tone or signal, clicking a mouse button, etc. At step 926, the controller 220 decodes the user interaction into a user event as defined by the relevant GUI element that was used. The user event is forwarded over the network to the DDI target 210 using a user event message 430 including the GUI element identification and the action taken.

At step 928 of FIG. 9B, a notification of the changed element in the form of a response message 435 is immediately forwarded to the controller 220 by the target 210 so that the controller 220 can update its GUI, if necessary, as a result of the user action. Message 435 is in response to message 430, generally. For instance, if an icon of a button was depressed, the target 210 would immediately forward this state of the GUI button element to the controller 220 so that the controller 220 would update the representation of the button as being depressed at step 930. Message 435 includes the GUI element identification and a new state code.

Also at step 928, the target 210 can indicate changes in a GUI element that are a result of some decision of the target 210 and/or a new operational state of the target 210 that is based on a previous user action, or based on some third hand interaction with the target 210, e.g., a direct interface with the physical panel (assuming one exists) of the target device 210. These messages are represented by messages 440. Process 922 continues as long as the DDI controller 220 is subscribed as shown by step 932.

FIG. 9C illustrates process 940 of the DDI target 210 which operates generally concurrently with process 922. At step 942, the DDI target 210 receives a user action (from a DDI controller 220), sometimes called a user event, in the form of message 430. At step 944, an immediate response (if necessary) is sent to the DDI controller 220 in the form of message 435 so that the DDI controller 220 can update its GUI to reflect the user action. For instance, change a displayed icon to represented a depressed button as a result of a button being pressed by the user. At step 946, the target device 210 interprets the user action to determine if a new operational state is to be entered as a result of the user interaction. For instance, if the user action was a press of a GUI button element with label "play," then a target tape device might likely initiate its internal tape playback mechanism. At step 948, an internally generated device state (for example, the "end-of-tape" condition for the tape player mentioned above) may result in the target device sending a NotifyGuiChange message 440 to the controller. As shown by 950, this process 940 continues as long as the DDI controller 220 is subscribed.

NAVIGATION AROUND THE GUI HIERARCHY

DDI controller 220-Driven Navigation. If a DDI controller 220 chooses not to render a whole panel, then the DDI controller 220 generally provides some means consistent with the capabilities of the user input and display output devices to allow the user to bring un-rendered elements into view. To allow the user to control this process, the DDI controller 220 can render items of its own choosing (e.g., arrows, scroll bars, etc.). These items are not obtained from the DDI target 210 and are specific to the DDI controller 220 implementation.

If the DDI controller 220 implements DDI controller 220-driven navigation, it does so locally without explicit DDI target 210 involvement. That is, the DDI controller 220 may not during this process send UserAction messages 430 to the target 210, though it (the DDI controller 220) can obtain additional GUI elements from the target 210. This process is called, DDI controller 220-driven navigation. GUI elements can contain attributes which the DDI controller 220 may or may not use to guide the user during DDI controller 220-driven navigation.

User-Driven Navigation. It is possible for DDI data to contain non-organizational GUI panel link elements. A panel link element has as the value of a mandatory attribute the ID of a panel element. Other attributes suggest a position and appearance for the rendering of the panel link element. This type of element offers a means for the DDI controller 220 to switch at the explicit request of the user from one panel to another. For instance, if the user selects this element, the DDI controller 220 can abandon rendering the currently rendered panel, make the specified panel element the current panel, and render it appropriately. This process is called user-driven navigation. Again, as for DDI controller 220-driven navigation, the DDI target 210 will only be consulted if the DDI controller 220 needs additional GUI elements. In this case, UserAction messages 430 will not be sent by the DDI controller 220. GUI panel link elements thus make it possible for a DDI target 210 to specify GUI hierarchies of effectively arbitrary depth below the root panel.

Notification Scope for Target GUI Changes. As mentioned above, at any time while a DDI controller 220 is subscribed to a target 210, the DDI target 210 can indicate that its GUI description (some or all of which the DDI controller 220 may have previously read from the target 210) has changed by sending a NotifyGuiChange message 440 to the DDI controller 220. Arguments to this message will provide the DDI controller 220 with information about which parts of the target 210's GUI description have changed.

The DDI target 210 may also indicate that its GUI description has changed in its response to a UserAction message 430 sent to it by the DDI controller 220. For large target GUI descriptions, this may lead to many possibly extraneous notification messages being sent to the DDI controller 220. A mechanism exists within the DDI model to reduce this message traffic. For instance, it is possible for the DDI controller 220 to give the DDI target 210 a description of a portion of the target 210's GUI description, the current notification scope. The DDI target 210 will only notify the DDI controller 220 of changes to those DDI target 210 GUI elements that are within the notification scope. DDI target 210 GUI elements outside of the current notification scope may change but the DDI target 210 will not send a corresponding indication to the DDI controller 220. This indication is called a change report and may refer to zero or more changed GUI elements. A change report is included in the arguments for both the UserAction and NotifyGuiChange messages.

Any non-organizational DDI target 210 GUI element that changes and is within the current notification scope will be included in the change report sent by the DDI target 210 to the DDI controller 220. If a GUI element is added to or removed from an organizational target GUI element, then that organizational element will be included in the change report sent by the DDI target 210 to the DDI controller 220. For low notification-traffic situations, the DDI controller 220 can choose to set the notification scope to be the complete target GUI description. In higher traffic situations, the DDI controller 220 can set the notification scope to be restricted to the current panel.

APIs for Data Driven Interaction

This section describes the data structures and APIs for supporting the level 1 Graphics User Interface (GUI) control of a DDI target such as a DCM within the HAVi architecture. The data structures represent a set of GUI elements that can be extracted from a DDI target 210 and presented on a display screen 105. These GUI elements are sufficient in capability to allow a DDI target 210 to be controlled by the user bringing focus onto these elements and causing actions to be sent to the target 210. These actions are described herein. In turn, a DDI target 210 can inform the user of elements changing in the target.

TABLE II

Services Provided

| Service | Comm Type | Locality | Access |
|---|---|---|---|
| DDITarget::SubscribeGui | M | global | DDI controller |
| DDITarget::UnsubscibeGui | M | global | DDI controller |
| DDITarget::GetGuiElement | M | global | all |
| DDITarget::GetGuiPanelList | M | global | all |
| DDITarget::GetGuiGroupList | M | global | all |
| DDITarget::GetGuiElementList | M | global | all |
| DDITarget::UserAction | M | global | DDI controller |
| DDIController::NotifyGuiChange | N | global | DDI target (DDI controller) |

GUI element data structure overview. The DDI mechanism of the present invention includes an application that is acting like a DDI controller 220 and a device as the target 210. The DDI target 210 receives all the service methods described above except for the NotifyGuiChange which is issued back to the DDI controller 220 from the DDI target 210 to indicate GUI element changes originating in the target device 210.

The GUI elements are the structures that a device can use to define how it should be represented on the display screen 105. These elements are put on a screen by an application. A given element can be defined to allow the user to interact with it. In these cases, the user can apply a set of actions that result in this element's ID being returned to the device along with the respective action. Some elements are presented by the device to provide only navigation among elements. In these cases, no actions are sent back to the device. Navigation can be done between panels, groups, and/or individual elements.

DDI terminology used herein is defined to be the following. Navigation is the controller responding to user inputs for moving from one GUI element to another. How this is done is controller specific. It could be with a remote control up, down, left, and right arrows. Focus is the result of the controller navigating to a GUI element. This is controller specific but the user experience results in the GUI element being highlighted, selected by changing color, etc. Interactive is once focus is on a GUI element, the user can place an action on this element resulting in this input being sent to the target device along with the GUI element ID. Display-only is a GUI element that the target provides which the controller displays but the controller does not navigate to it, thus not allowing either focus or interaction to take place. This GUI element is for display only.

A panel element is intended to represent an entire screen's worth of GUI elements. Within the panel can be zero or more groups of individual elements. In addition, a panel can have standalone elements that are not part of any group. Navigation can be specified by the device for going from panel to panel, from group to group, and from element to element. An element consists of its main definition part, followed by mandatory attributes and optional attributes. All elements have a label that is defined to be a text string of minimum length one and maximum length fifteen, in one embodiment. A label is allowed to exceed the maximum length, but controllers are then allowed to render only the indicated maximum. In this case targets "know" that a user might not be able to see the complete label and the target can take this into account when designing the level 1 GUI.

The concepts of panel, group, and label are used by a display device to present a given panel in three DDI modes: full-capability, scaled-down and text. If the devices current panel can be displayed on the whole screen as outlined and defined by the device than the display is said to be presented to the user as "full-capability." If the display device can not display the entire panel as given it can than drop down to the next mode of "scaled-down." Suggestions on how to scale down would be represented by the groups within a panel. The display device could than display one group at a time and move between groups by displaying next and previous groups. The last mode, "text," would be if the display device can only display either lines of text or one line of text at a time. In this case, the label is used to display this element and can be selected by the user.

A GUI element has the attributes height and width. The attribute, position, is used to place it in a logical location on the panel relative to all other elements and groups. A panel size will be chosen to represent a typical screen display and each element's size will be relative to this. Each target device supports the same panel size for all of its panels. The GUI element, GuiPanelLink, does not send any message to the target device according to the user action. The "navigation" from the current panel to a different panel is done by the display device getting the next panel as contained in the panelLink attribute. The user selecting the GuiPanelLink element does not result in any GUI action other than the display device itself requesting the panel in the GuiPanel-Link by using the API call getGuiElement. The same holds for groups and the panels themselves.

The display device has the freedom to display the GUI elements in any manner it sees fit. The element's mandatory and optional attributes are intended to be suggestions to the display device on how to organize and present the device panels, groups, and standalone elements to the user. Panels and groups can have background colors and/or patterns. Colors provide for transparency. A pattern may take the form of a tiled sequence of icons, this would allow for textured appearances. All images conform to PNG and HAVi row bitmap formats and these format are distinguished by file signature.

Panels and groups can have audio and/or video content that will be streamed in real-time when the GUI element gets the focus. In the case of audio this would allow a panel to have background music while each animation icon could be describing some device function as verbal audio speech. If either the device or the display device (controller) goes away then the HAVi messaging system capabilities of "watch on," "watch off" will notify each respective object that the other one has gone away. A device uses the NotifyGuiChange service to spontaneously put on the screen GUI elements describing changes in current panel elements or new elements. These elements would than become part of the current panel as defined by the SubscribeGUI scope parameter. It would be up to the DDI controller 220 how and when to display these types of elements when they are received in this context.

An example of a GUI element definition is given below. GuiElementId is used for identification of all GUI elements specified herein.

| //GuiElementId Representation | | |
|---|---|---|
| //Syntax | Nb of bits | Identifier |
| GuiElementId() {<br>GuiElemType<br>GUIElementHdl<br>} | 8<br>16 | uimsbf<br>uimsbf |

The following gives some general DDI type definitions:

```
typedef ushort GuiElementId;
typedef sequence<GuiElementId> GuiElementIdList;
typedef sequence<GuiElement> GuiElementList;
typedef ushort GuiContentId;
typedef octet Color[3];            // R,G,B true color
typedef octet Color[COLORLENGTH];  // length to be defined
typedef sequence<octet> Bitmap;    // variable size
typedef sequence<octet> Sound;     // variable size
typedef sequence<char> Label;
typedef ushort Relation;
typedef short Font;
typedef Channel AudioVideo;
       // stream manager iso channel media
       // channel definition is in Stream
       // Manager section
enum Selectable {SET, UNSET};
struct Pattern {
   ushort height;
   ushort width;
   GuiContentId Bitmap pattern_bitmap;
}
```

A bitmap is an image and a sound is an audio file format identified by GuiContentId. A bitmap and/or sound can optionally be part of certain GUI elements and is intended to be a small amount of data. This would be used to attach short sounds to button clicks, release, and presses for example. These are in contrast to media streams being played back in real-time. The terms audio and video will be used when media stream references are required. The DDI protocol also allows for the DDI controller 220 to setup audio and video media streams using the Stream manager isochronous channels. If a GUI element has audio and/or video stream content then it can be supported by the Stream Manager and managed using the stream manager facilities. Within the optional attribute AudioVideo is the channel number supplied by the target. If the controller 220 can accept and provide media streams then the controller would listen on this channel number for content being supplied by the target on this channel.

A panel is defined to be two dimensional with the upper left corner being defined as (x=0, y=0). The entire panel size is programmable. All positions given for groups or standalone elements would be relative to this (0,0) coordinate. A standalone element is not part of any group. The elements within a group have position values based on the group upper left most position being x=0, y=0. The x-coordinate is positive incrementing from left to right. The y-coordinate is positive incrementing from top to bottom.

```
struct Position {
   ushort x_position;
   ushort y_position; };
```

Every GUI element has a label. This label is to be used in the case when the display device is in text-only mode. The label should describe the GUI element function. It is suggested that this label length not exceed fifteen characters. In all cases this set of fifteen characters will be displayed; whether the device is scrolling it across an LED or displaying it on a screen. The mandatory attributes of a GUI element must be included in the DDI data. The mandatory attributes of a GUI element must be included in the device's definition. The optional attributes need not be present but if included are intended to give the display device directions on displaying this particular GUI element. These optional attributes are defined in a (possibly empty) list at the end of the structure. For each GUI element type it is indicated by comments which optional attributes are valid.

A target device returns the same GuiElementID for a given element. It is up to the controller how many GUI elements are retrieved and when they are retrieved. The target device only knows about what was last pulled from it by the API calls getting the elements and/or element lists. No GUI elements should overlap by defining their positions to be at the same relative location.

typedef string Hotlink; // representing a URL

The following exemplary structure defines the navigation in one implementation:

```
struct FocusNavigation {
    GuiElementId up;         GuiElementId down;
    GuiElementId left;       GuiElementId right;
}
typedef GuiContentId Title;     // smaller than 10% of safety area
sizetypedef Bitmap Title;       // size to be defined
    struct Date {
        unsigned short Year;      // e.g. 1998
        unsigned short Month;     // 1 to 12
        unsigned short Day;       // 1 to 31
        unsigned short Hour;      // 0 to 23
        unsigned short Minute;    // 0 to 59
        unsigned short Second;    // 0 to 59
    }
    struct Time {
        unsigned short Hour;      // 0 to 23
        unsigned short Minute;    // 0 to 59
        unsigned short Second;    // 0 to 59
    }
```

DDI data can include text data, bitmap data and sound data, and indicate stream data. The DDI controller uses them for the presentation of panels in DDI data. All formats are divided into two distinct classes: mandatory formats and optional formats. The mandatory formats for DDI data are specified below, and all DDI controllers shall support mandatory text format at least. The data using optional formats shall be described in GUI element with optional attributes bitmaptype and soundtype. These optional attributes are used to all for future extension, so these attributes are not defined in the HAVi architecture.

Bitmap format. Both PNG and raw bitmap are used for HAVi bitmap format. However it is not necessary to have bitmap type attribute on each GUI element, because they are distinguished by using file signature.

Regarding PNG, details on this format are given in PNG specification (IETF RFC 2083). However, in one embodiment, DDI data does not support the full specification of PNG, there are some limitations on it, the color type=3 (index color, max. 8bit color) and the bit depth=1, 2,4,8 (max. 8bit color).

Regarding HAVi raw bitmap, which is defined by HAVi, is also used for HAVi bitmap format. HAVi raw bitmap format described below uses the same style as IHDR, PLTE chunk format described in PNG specification. And RIDAT chunk defined by HAVi is used instead of IDAT chunk.

Regarding the file signature, the first eight bytes of a HAVi raw bitmap file always contain the following values:

| | |
|---|---|
| (decimal) | 137 72 65 86 105 13 10 26 |
| (hexadecimal) | 89 48 41 56 69 0d 0a 1a |
| (ASCII C notation) | †21 1 H A V i †r †n †032 |

Regarding HDR, the IHDR chunk appears first in bitmap data. It contains:

| | |
|---|---|
| Width: | 4 bytes |
| Height: | 4 bytes |
| Bit depth: | 1 byte (value: 8) |
| Color type: | 1 byte (value: 3, index color, max 256 color) |
| Compression method: | 1 byte (value: 255, no compression) |
| Filter method: | 1 byte (value: 255, no information) |
| Interlace method: | 1 byte (using PNG method) |

Regarding PLTE, the PLTE chunk contains from 1 to 256 palette entries, and each entry has a three-byte series of the form: Red(1 byte), Green(1 byte), Blue(1 byte). The first entry in PLTE is referenced by pixel value 0, the second by pixel value 1, etc., the PLTE chunk may have fewer entries than the bit depth. In that case, any out-of-range pixel value found in the RIDAT chunk is an error.

Regarding RIDAT, the RIDAT chunk contains the actual image data. To create this data image scan lines are represented as described in the PNG Image layout. The layout and total size of this raw data are determined by the fields of IHDR in the PNG specification. The RIDAT chunk contains the raw image data.

Sound data. The AIFF-C format (DAVIC 1.3 Part 9, Annex B "Coding of Linear Audio") is used for HAVi sound format. However, in one embodiment, DDI data does not support the full specification of AIFF-C, there are some limitations on it. The sample size=8 bit and the sample rate=22.050 kHz Audio Video Stream. There is no mandatory audio. video stream format in HAVi DDI. Optional attribute audiovideo shows the channel number supplied audio and/or video stream by the DDI target. The type of this audio and/or video stream is defined in the section of the HAVi stream manager, e.g., the HAVi stream type shows the data format on the channel given by the audiovideo attribute. When the audiovideo attribute is given in the DDI data, DDI controller can use the audio video stream for background video, etc. If the audiovideo attribute is valid, DDI controller 220 should consider audiovideo as higher priority to background picture, background pattern and background color. The following is an example:

```
enum ContentType {PNG, HAVi_RAW_BITMAP,
    AIFF-C, UNICODE}
union GuiContent switch (ContentType) {
    case PNG: Bitmap pngbitmap;
    case HAVi_RAW_BITMAP: Bitmap rawbitmap;
    case AIFF-C: Sound sound;
    case UNICODE: string text;
};
enum OptAttrType {POSITION, BACKGROUND_
    COLOR,
    BACKGROUND_PATTERN, BACKGROUND_
        PICTURE_LINK, AUDIO_VIDEO,
    DEVICE_BITMAP, CONTENT_BITMAP,
        PRESSED_BITMAP_LINK,
    RELEASED_BITMAP_LINK, HOTLINK, FONT,
        RELATION,
```

```
FOCUS_NAVIGATION,
    SHOW_WITH_PARENT, TITLE,MAX_LABEL,
        MIN_LABEL,
CENTER_LABEL,
    FOCUS_SOUND_LINK,PRESSED_SOUND_
        LINK, RELEASED_SOUND_LINK,
    HELP_PANEL_LINK,
    PLAYBACK_TIME, RECORDED_DATE,
        broadcast_date};
enum OptAttrType {POSITION, BACKGROUND_
    COLOR,
    BACKGROUND_PATTERN, BACKGROUND_
        PICTURE, AUDIO_VIDEO,
    DEVICE_BITMAP, PRESSED_BITMAP,
        RELEASED_BITMAP, HOTLINK,
    FONT, RELATION, FOCUS_NAVIGATION,
        SHOW_WITH_PARENT,
    TITLE, MAX_LABEL, MIN_LABEL, CENTER_
        LABEL,
    FOCUS_SOUND, PRESSED_SOUND,
        RELEASED_SOUND,
    HELP_PANEL_LINK};
union OptionalAttribute switch (OptAttrType) {
    case POSITION: Position position;
    case BACKGROUND_COLOR: Color background_
        color;
    case BACKGROUND_PATTERN: Pattern back-
        groundpattern;
    case BACKGROUND_PICTURE_LINK: GuiCon-
        tentId backgroundPicture;
    case AUDIO_VIDEO: AudioVideo audiovideo;
    case DEVICE_BITMAP: Bitmap devicebitmap;
    case CONTENT_BITMAP: Bitmap contentbitmap;
    case PRESSED_BITMAP_LINK: GuiContentId
        pressedbitmap;
    case RELEASE_BITMAP_LINK: GuiContentId
        releaseddbitmap;
    case FOCUS_SOUND_LINK: GuiContentId focus-
        sound;
    case PRESSED_SOUND_LINK: GuiContentId
        pressedsound;
    case RELEASED_SOUND_LINK: GuiContentId
        releasedsound;
    case HOTLINK: string hotlink; // represents URL
    case FONTSIZE: Fontsize fontsize;
    case RELATION: Relation relation,
    case FOCUS_NAVIGATION: FocusNavigation focu-
        snavigation;
    case SHOW_WITH_PARENT: boolean showwith-
        parent;
    case TITLE: Title title;
    case MAX_LABEL: Label maxlabel;
    case MIN_LABEL: Label minlabel;
    case CENTER_LABEL: Label centerlabel;
    case HELP_PANEL_LINK: GuiElementId helppan-
        ellink;
    case playback_time: Time playbacktime;
    case recorded_date: Date recordeddate;
    case broadcast_date: Date broadcastdate;
};
union OptionalAttribute switch (OptAttrType) {
    case POSITION: Position position;
    case BACKGROUND_COLOR: Color background_
        color;
    case BACKGROUND_PATTERN: Pattern back-
        groundpattern;
    case BACKGROUND_PICTURE: Bitmap back-
        groundPicture;
    case AUDIO_VIDEO: AudioVideo audiovideo;
    case DEVICE_BITMAP: Bitmap devicebitmap;
    case PRESSED_BITMAP: Bitmap pressedbitmap;
    case RELEASE_BITMAP: Bitmap releasedbitmap;
    case FOCUS_SOUND: Sound focussound;
    case PRESSED_SOUND: Sound pressedsound;
    case RELEASED_SOUND: Sound releasedsound;
    case HOTLINK: string hotlink; // represents URL
    case FONT: Font font;
    case RELATION: Relation relation,
    case FOCUS_NAVIGATION: FocusNavigation focu-
        snavigation;
    case SHOW_WITH_PARENT: boolean showwith-
        parent;
    case TITLE: Title title;
    case MAX_LABEL: Label maxlabel;
    case MIN_LABEL: Label minlabel;
    case CENTER_LABEL: Label centerlabel;
    case HELP_PANEL_LINK: GuiElementId helppan-
        ellink;
};
typedef sequence<OptionalAttribute> OptAttrList;
enum Scope {CURRENT, GLOBAL};
enum DDIError
    {ENOGEI, ENOSUB, EINVALID, ENOPANEL,
        ENOGROUP, ENOTCUR,
    };
enum Fontsize {SMALL, MEDIUM, LARGE};
```

Individual GUI elements defined. Groups will not have explicit navigation suggestions; the only suggestion is the order of the group IDs in the panel list. The DDI controller 220 navigates between groups in this order (or some other order if it has a reason to deviate from this). GUI Elements (not panels and groups) can have optional focus change suggestions, which the controller can use to move the focus on screen. The basic set of directions is up, down, left, right, but the controller is free to have its own input device which can map to these concepts (e.g., it does not need to have an IR remote with 4 buttons). The controller can, for instance, present groups of elements as small opaque blocks on the screen, and can either make the panel background opaque or transparent. The DDI controller 220 has the freedom to display both standalone elements and groups in any manner it sees presentable.

The bitmap format can have facility to define the characteristics of the screen 105, it is based on the Gamma and on what platform the particular bitmap was designed. There will be an optional color attribute to define the characteristics of the screen that is displaying a bitmap. In this way colors and brightness levels will appear correct whether its being displayed on a TV screen or other display device. GUI elements can have optional sound suggestions, which the controller can playback a sound following to user operation. The element pressed_sound indicates once playback when the GuiButton is pressed, released_sound indicates once playback when the GuiButton is released, and forcusSound indicates once playback when the GuiElement gets focus.

GUI elements can have optional fontsize suggestions. In case of full capability devices, as a guideline, MEDIUM size is specified in 16×32 pixel (two byes code such as kanji code is 32×32), SMALL size is specified in 12×24 pixel (two byes code is 24×24) and LARGE size is specified in 20×40 pixel (two byes code is 40×40). MEDIUM is the default font size when no Fontsize is specified. In one implementation, the GUI elements are:

```
    enum GuiElemType (GUI_PANEL, GUI_GROUP,
        GUI_BUTTON,
```

```
GUI_PANELLINK, GUI_ANIMATION, GUI_
   SHOWRANGE,
GUI_SETRANGE,
GUI_ENTRY, GUI_CHOICE, GUI_TEXT, GUI_
   STATUS, GUI_ICON,
CONTENT_ICON, DEVICE_ICON};
union GuiElement switch (GuiElemType) {
   case GUI_PANEL: GuiPanel panel;
   case GUI_GROUP: GuiGroup group;
   case GUI_PANELLINK: GuiPanelLink panellink;
   case GUI_BUTTON: GuiButton button;
   case GUI_ANIMATION: GuiAnimation animation;
   case GUI_SHOWRANGE: GuiShowRange show-
      range;
   case GUI_SETRANGE: GuiSetRange setrange;
   case GUI_ENTRY: GuiEntry entry;
   case GUI_CHOICE: GuiChoice choice;
   case GUI_TEXT: GuiText text;
   case GUI_STATUS: GuiStatus status;
   case GUI_ICON: GuiIcon icon;
   case CONTENT_ICON: ContentIcon contenticon;
   case DEVICE_ICON: DeviceIcon deviceicon;
};
```

In the GUI elements that require the user to send information back to the device, e.g. entry, only when the user has finished entering the information would the controllerthan send back the updated field. When and how the controller knows when to send the update is determined by the controller. It could be an ENTER button on the remote, typing the ENTER key on a keyboard, etc. The RELATION optional attribute is used to identify a set of GUI elements that are indications to the controller to try and display these together if the controller is in scale-down mode. The relation attribute can occur more than once in an optional attribute list of a GUI element.

GuiPanel. The Gui Panel element can contain groups, links, and standalone elements. It can not contain other panel elements, though. It has its own GuiElementId. When using the SubscribeGui API call, the device will return the root panel GuiElementId. All panels are linked from this root panel. The actual panel size is not specified, but a safety area size which any full capability controller can generally display a panel on is 640×400 pixel, e.g., the upper-left corner as the user faces the device is <0,0>; the lower-right is <639, 399>. If the panel has the attribute of background AudioVideo, pattern, picture or color, then the background of the panel is displayed on actual full screen (e.g., 720×480 or 720×576).

The AspectRatio attribute shows the aspect ratio of the panel and the controller may or may not display the panel using this aspect ratio, e.g., a high grade controller might support all aspect ratio but low grade controller might support only one aspect ratio for panels. The optional attribute ShowWithParent is used to indicate that this panel, if possible, should be displayed at the same time as its parent panel. The parent panel is defined as the panel previous to this current panel in the GuliPanelLink element panelLink attribute. The following is an example:

```
enum AspectRatio {
   // unknown, or non-standard format (pixel aspect ratio)
   UNKNOWN_PIXEL_ASPECT_FORMAT,
   // square pixels (1.0)
   SQUARE_PIXEL_ASPECT_FORMAT,
   // 720 by 576 pixels rendered on a physical 4 by 3
      display (1.067)
   PAL_720_BY_576_DISPLAY_4_BY_3_
      PIXEL_ASPECT_FORMAT,
   // 704 by 480 pixels rendered on a physical 4 by 3
      display (0.909)
   NTSC_704_BY_480_DISPLAY_4_BY_3_
      PIXEL_ASPECT_FORMAT,
   // 720 by 480 pixels rendered on a physical 4 by 3
      display (0.889)
   ARIB_720_BY_480_DISPLAY_4_BY_3_
      PIXEL_ASPECT_FORMAT,
   // 720 by 576 pixels rendered on a physical 16 by 9
      display (1.422)
   PAL_720_BY_576_DISPLAY_16_BY_9_
      PIXEL_ASPECT_FORMAT,
   // 704 by 480 pixels rendered on a physical 16 by 9
      display (1.212)
   ATSC_704_BY_480_DISPLAY_16_BY_9_
      PIXEL_ASPECT_FORMAT,
   // 720 by 480 pixels rendered on a physical 16 by 9
      display (1.185)
   ARIB_720_BY_480_DISPLAY_16_BY_9_
      PIXEL_ASPECT_FORMAT,
};
struct GuiPanel {
   Label panel_name;
   GuiElementIdList elements;
   AspectRatio aspect;
   OptAttrList optionals;
}; struct GuiPanel {
   Label panelName;
   GuiElementIdList elements;
   OptAttrList optionals;
};
// valid optional attributes:
// ShowWithParent
// BackGroundColor
// FocusSound
// fontsizefont
// Title
// AudioVideo
```

GuiGroup. The GuiGroup element is optional. It is suggested to be used to indicate to the controller a set of elements that the device wants to be displayed together. This grouping is helpful when the controller has to scale down the panel and this provides the controller with the elements that need to appear together possibly on separate screens. The GuiGroup does notcontain GuiPanel elements or other Gui-Group elements. A GuiGroup has its own GuiElementId. The number of the GuiGroup's GuiElementId shows the display priority. When the DDI controller 220 has to scale down the panel, the DDI controller 220 displays the group which has the smallest number of GuiElementId on the first page. The background color, picture, audiovideo, and pattern can be chosen to be the background of this group. Only one of these should be present. The following is an example structure.

```
struct GuiGroup {
   Label groupName;
   ushort height; ushort width;
   GuiElementIdList elements;
   OptAttrList optionals;
};
// valid optional attributes:
// Position
// BackGroundColor
// BackgroundPicture
// BackgroundPattern
```

// fontsizeFont
// Title
// AudioVideo
// Relation

GuiPanelLink. The GuiPanelLink GUI element is not interactive so the user selecting this element on the screen does not result in anything being sent to the device. The bitmap provided with a GuiPanelLink is used by the controller to represent this item; how it is presented (as an icon, button, etc.) is up to the DDI controller 220. A suggestion for GUI designers is to include the GuiPanelLink elements together in one group so that the display device can display them together. When displaying a scaled-down GUI, the display device must enable the user to navigate between all GUI elements. How the display device does this is its decision. The recommended size for the linkBitmap is to allow it to be easily displayed on a screen along with a full size panel. This allows a standard way of displaying GUI elements that are presented specifically to the user for navigation purposes. The following is an example structure.

```
struct GuiPanelLink {
    Label linkName;
    GuiContentId Bitmap linkBitmap;
    ushort linkHeight;
    ushort linkwidth;
    GuiElementId panelLink;
    OptAttrList optionals;
};
// valid optional attributes:
// Position
// FocusSound
// fontsizeFont
// FocusNavigation
// HelpPanelLink
```

GuiButton. A GuiButton element can be composed of a number of optional attributes. The display device determines how the button is presented on the screen. The button element allows numerous actions to be placed on it and the controller can determine how this is presented to the user interacting with this GUI element. The following is an example structure.

```
struct GuiButton {
    Label pressed_label;
    Label release_label; // ignored if button_type=1
    unsigned short height; unsigned short width;
    unsigned short button_type;
    // 0: press/release button, 1: single-state button
    OptAttrList optionals;
};
struct GuiButton {
    Label pressedLabel;
    Label releaseLabel; // ignored if state=2
    ushort height; ushort width;
    ushort state;
    // 0: released, 1: pressed, 2: single-state button
    OptAttrList optionals;
};
// valid optional attributes:
// Position
// pressedbitmap
// releasebitmap // ignored if button_type=1
// releasebitmap // ignored if state=2
// pressedsound
// releasedsound // ignored if button_type=1
// releasedsound // ignored if state=2
// fontsizefont
// FocusNavigation
// Relation
// HelpPanelLink
```

GuiAnimation. This element is a multiple image icon (animation).

```
enum repetitiontype {PLAY_ONCE, PLAY_REPEAT,
    PLAY_ALTERNATING};
```

Play alternating means when it reaches the end, it plays the images backwards until it reaches the beginning and than start going forwards again. A graphics controller does not have to display the labels when displaying the associated bitmaps. The following is an example structure.

```
struct AnimationElement {
    Label iconname;
    GuiContentId Bitmap iconbitmap;
};
struct GuiAnimation {
    Selectable selectable;
    ushort speed; // in units of 0.1 sec.
    RepetitionType repetition;
    ushort height; ushort width;
    sequence<AnimationElement> animations;
    // sequence should be non-empty
    OptAttrList optionals;
};
// valid optional attributes:
// Position
// FocusSound
// fontsizefont
// FocusNavigation (only if selectable=SET)
// Relation
// HelpPanelLink
```

GuiShowRange. The following is an example:

```
enum orientationType {HORIZONTAL, VERTICAL,
    DIAL};
struct GuiShowRange {
    Label rangeName;
    ushort valueRange;
    ushort stepValue;
    ushort valueset;
    orientationType orientation;
    ushort height; ushort width;
    OptAttrList optionals;
};
// valid optional attributes:
// Position
// BackGroundColor (color used for range indicator)
// FocusSound
// FocusNavigation
// fontsizeFont
// Relation
// MaxLabel
// MinLabel
// CenterLabel
// HelpPanelLink
```

GuiSetRange. The following is an example:
```
struct GuiSetRange {
   Label rangeName;
   ushort value_range;
   ushort step_value;
   ushort value_set;
   orientationType orientation;
   ushort height; ushort width;
   OptAttrList optionals;
};
```
// valid optional attributes:
// Position
// BackgroundColor (color used for range indicator)
// FocusSound
// fontsizeFont
// FocusNavigation
// Relation
// MaxLabel
// MinLabel
// CenterLabel
// HelpPanelLink GuiEntry. The following is an example:
```
enum EntryType {TEXTUAL, NUMERIC}
enum Qualifier {CONCEAL, VISIBLE}
```
// the CONCEAL attribute determines whether characters
// within the Entryfield should be displayed,
// e.g. for PIN entry
```
struct GuiEntry {
   Label entryName;
   EntryType type;
   Qualifier qualifier;
   ushort height; ushort width;
   OptAttrList optionals;
};
```
// valid optional attributes:
// Position
// BackgroundColor (color used for entry indicator)
// FocusSound
// FocusNavigation
// fontsizeFont
// Relation
// HelpPanelLink GuiChoice This element refers to the action on the choice elements for determining how it returns the list of choices made or only returns the single choice (radio button). And element_status is used for current value of this element, e.g., chosen or not_chosen. A graphics capable controller does not need to show the Labels when displaying the supplied bitmaps. The following is an example structure.
```
struct ChoiceElement {
   Label choice_name;
   GuiContentId choice_bitmap;
   Boolean element_status;
struct ChoiceElement {
   Label choiceName;
   Bitmap choiceBitmap;
};
enum ChoiceType {LESS_THAN, EQUAL, MORE_THAN};
struct GuiChoice {
   ChoiceType type;
   ushort choiceNumber;
   sequence<ChoiceElement> choiceList;
   // sequence should be non-empty
   ushort height; ushort width;
   OptAttrList optionals};
```
// valid optional attributes:
// Position
// BackgroundColor (color used for choice indicator)
// FocusSound
// FocusNavigation
// fontsizeFont
// Relation
// HelpPanelLink GuiText. The text GUI element is used if the device only wants to display text with no user entry. String data can have at most 40 characters on horizontally and yertical limit is not needed because controller can use scrolling if necessary. The text GUI element is used if the device only wants to display text with no user entry. It can be used for textual display only or can be used as an interactive field that would be a text string that is a hot link. The hotlink atfribute if present would define the text as containing a URL address. It would be up to the controller whether to link to the address site or not. The following is an example structure.
```
struct GuiText {
   Selectable selectable;
   ushort height; ushort width;
   GuiContentIdstring text;
   // text can contain newline characters,
   // however text lines should not be longer than 40
   // characters. There is no limit on the number of
   // lines; a controller will use scrolling facilities
   // if needed.
   OptAttrList optionals;
};
```
// valid optional attributes:
// Position
// BackgroundColor
// Hotlink
// Focussound
// FocusNavigation (only if selectable=SET)
// fontsizeFont
// Relation
// HelpPanelLink GuiStatus. This element is used to provide to the controller continuous status updates. This would provide GUI functions such as hourglass, barber pole, incrementing bar, etc. The following is an example structure.
```
enum StatusType {HOURGLASS, BARBER_POLE};
struct GuiStatus {
   Label statusName;
   StatusType type;
   ushort height; ushort width;
   OptAttrList optionals;
};
```
// valid optional attributes:
// Position
// BackGroundColor (color used for range indicator)
// fontsizeFont
// Relation
// HelpPanelLink GuiIcon. This element is used to display a bitmap image for either selection or display only. If the controller displays the bitmap, it is suggested that it does not display the label. The following is an example structure.

```
struct GuiIcon {
  Selectable selectable;
  Label iconname;
  ushort height; ushort width;
  GuiContentId iconbitmap;
  bitmap icon;
  OptAttrList optionals;
};
// valid optional attributes:
// Position
// Focussound
// FocusNavigation (only if selectable=SET)
// fontsizeFont
// Relation
// HelpPanelLink
```

ContentIcon. This icon when displayed represents what content the target device has. This icon when displayed represents that the target device contains either audio only or audio and video content. The DCM for this device makes use of this icon for user selection of the AV content. When selected the target device starts playing this content out the specified channel as described in the DCM section.

The availability attribute shows whether or not the content shown by the content icon is available now. And playbacktime shows the time required for playback this content, recordeddate shows when this content was recorded and is valid for storage device, and broadcastdate shows when this content is transmitted from broadcasting station and is valid for tuner device. The following is an example structure.

```
struct ContentIcon {
  Label contentName;
  Boolean availability
  //TRUE: available now, FALSE: not available now
  OptAttrList optionals;
};
// valid optional attributes:
// contentbitmap // with size limits
// focussound
// Fontsize
// playbacktime
// recordeddate
// broadcastdate
struct ContentIcon {
  Label contentName;
  OptAttrList optionals;
};
// valid optional attributes:
// contentbitmap // with size limits
// focussound
```

DeviceIcon. The device icon GUI element is returned by the HAVI DCM And DCM Manager API call GetDeviceIcon. It is a vendor device option on how to represent the device. It is a text representation with the options of bitmap and/or sound. The size of the bitmap is recommended to be a size that would allow a controller to easily display on the screen a number of device representations. This would allow the user to select a given device for further device control. The length of the sound should be kept to a small size that would be associated with this device. The following is an example:

```
struct DeviceIcon {
  Label deviceName;
  OptAttrList optionals;
};
// valid optional attributes:
// devicebitmap // with size limits
```

If the user wants to change the name of the device (label) then the device needs to provide this in the GuiEntry within the devices GUI elements. The device icon would be used by the controller to display this device on a network map or wherever the device needs to be visually represented. This Device Icon is required to be supported by the device. The DeviceIcon label denotes the HAVi UserPreferredName.

GUI ACTION DATA STRUCTURES

GUI actions are only defined for interactive GUI elements. Actions can be placed on GUI elements when the GUI element has the controller focus. How and when the focus is placed on a particular GUI element is-up to the controller. Typically, the focus would be shown by highlighting a box around the GUI element or changing its color. The GUI actions correspond to the GUI element types. In this way, the UserAction method can check the action taken is on the correct type of element. The following is an example structure.

```
enum ActType {ACT_BUTTON, ACT_SETRANGE,
    ACT_ENTRY, ACT_CHOICE, ACT_SELECTED};
enum ActButton {PRESSED, RELEASED};
typedef ushort ActSetRange; // for setting range values
    >=0 and <=value_range
typedef string ActEntry; // for entering characters
typedef sequence<ushort> ActChoiceList;
    // each number in ActChoiceList corresponds with
    // the index of the "checked" entry;
    // in case of single choice, ActChoiceList contains
    // only one number (the one selected).
typedef boolean ActSelected; // dummy value
union GuiAction switch (ActType) {
  case ACT_BUTTON: ActButton button;
  case ACT_SETRANGE: ActSetRange setRange;
  case ACT_ENTRY: ActEntry entry;
  case ACT_CHOICE: ActChoiceList choiceList;
  case ACT_SELECTED: ActSelected selected;
};
```

DATA DRIVEN INTERACTION API

Although a number of different APIs can be used to implement the present invention in accordance with the descriptions herein, the following represents example APIs that can be used in accordance with one implementation of the present invention.

DDITarget::SubscribeGui

Prototype

Status DDITarget::SubscribeGui( in Scope scope, out GuiElementId rootpanel)

Parameters are scope and root panel. Scope indicates whether the target should generate GUI change reports only for the current panel or for all available panels (global) and rootpanel is the GUI-element-ID of the initial (root) panel. This API Indicates to the target that its DDI is going to be used. The target returns the initial root panel. Also indicates to the target which controller it has to send NotifyGuiChange messages (SEID is part of a message). In case the target is a DCM, it also enables the DCM to tell other system components whether it is in use (e.g., to the DCM manager which might want to un-install the DCM).

The definition of current panel is the panel which the controller most recently pulled using either the GetGuiElement, GetGuiPanelList, GetGuiGroupList, or GetGuiElementList API. If more than one panel is pulled by the GetGuiElementList, the panel that is the last in the list will be the current panel. If the scope is CURRENT and the controller tries to pull a GUI element from outside the current panel, the element is returned but the error code ENOTCUR is returned warning that the controller will not receive change notifications for this GUI element. Error codes are ENOSUB indicating no more subscription for the DDI possible.

DDITarget::UnSubscribeGui

Prototype

Status DDITarget::UnSubscribeGui( )

This API Indicates to the target that above subscription ended. The target will not send anymore NotifyGuiChange messages to this controller. Error codes are ENOSUB indicating no subscription for the DDI.

DDITarget::GetGuiElement

Prototype

Status DDITarget::GetGuiElement( in GuiElementId geid, out GuiElement element)

Parameters are geid and element. Geid is the GUI-element-ID of the requested GUI-element and element the requested GUI-element returned. This API Pulls the requested GUI Element from the device. Error codes are ENOGEI indicating unknown GUI-element ID, ENOSUB indicating no subscription for the DDI, ENOTCUR indicating scope violation, pulled GUI element is not part of current panel.

DDITarget::GetGuiPanelList

Prototype

Status DDITarget::GetGuiPanelList( in GuiElementId geid, out GuiElementList elementList)

Parameters are geidList and elementList. GeidList is the panel GUI Element ID and elementList are the elements contained in that panel list for the GUI element structures. This API pulls the requested panel GUI Elements from the device. Error codes are ENOGEI indicating unknown GUI-element ID, ENOPANEL indicating element ID is not a panel, and ENOSUB indicating no subscription for the DDI.

DDITarget::GetGuiGroupList

Prototype

Status DDITarget::GetGuiGroupList( in GuiElementId geid, out GuiElementList elementList)

Parameters are geidList and element. GeidList is the group GUI Element ID and elementList are the elements contained in that group list for the GUI element structures. This API pulls the requested group GUI Elements from the device. Error codes are ENOGEI indicating unknown GUI-element ID, ENOGROUP indicating element ID is not a group, ENOSUB indicating no subscription for the DDI, ENOTCUR indicating scope violation, pulled GUI element is not part of current panel.

DDITarget::GetGuiElementList

Prototype

Status DDITarget::GetGuiElementList( in GuiElementIdList geidList, out GuiElementList elementList)

Parameters are geidList and elementList. GeidList is an arbitrary list of GUIElementID values and elementList are the corresponding list of GUI element structures returned. This API pulls the requested arbitrary list of GUI Elements from the device. Any type of GUI element can be retrieved with this operation, including GuiPanel and GuiGroup. It is up to the controller how to use the data once retrieved. Error codes are ENOGEI which indicates unknown GUI-element ID, ENOSUB indicates no subscription for the DDI.

DDITarget::GetGuiContent

Prototype

Status DDI::GetGuiContent in GuiContentId ceid, out GuiContent content);

Parameters are ceid and content. Ceid is the content-ID of the requested content and content is the requested content (e.g., bitmap or sound data) returned. This API pulls the requested content from the device. The return values are SUCCESS indicating successful GetGuiContent, ENOGEI indicating unknown Content-ID, and ENOSUB indicating no subscription for the DDI.

DDITarget::UserAction

Prototype

Status DDITarget::UserAction( in GuiElementId geid, in GuiAction action, out GuiElementIdList report)

Parameters are geid, action and report. Geid is the GUI-element-ID of the GUI-element associated with the user action, action is the action type, and report is the list of GUI-element-IDs of GUI-elements that changed due to this user action. This API indicates the User Action performed on the specified GUI element to the target. The response from the target indicates which GUI elements changed due to this user action. The report result will be reported based on the scope of notification requested by the controller using the SubscribeGUI API. The Error codes are ENOGEI indicating unknown GUI-element ID, EINVALID indicating invalid user action, ENOSUB indicating no subscription for the DDI ENOTCUR—scope violation, pulled GUI element is not part of current panel.

DDIController::NotifyGuiChange

Prototype

Status DDIController::NotifyGuiChange (in GuiElementIdList report)

Parameters are report which reports the list of GUI-element-Ids of GUI-elements that changed in the device. The controller receives a report that indicates which GUI elements changed spontaneously. The device knows the controller by the SEID contained in the message SubscribeGui.

DDI CONTROLLER PRESENTATION

A DDI controller has full ownership for presentation of DDI data from a DDI target. However, the guidelines below are recommended in order to keep some presentation consistency among DDI controllers made by different developers. These guidelines are, however, only recommendations and application software can create different representations, using the DDI data elements as hints.

Presentation Guideline. A DDI controller displays the DDI data on its screen at the same time by using one of three kinds of representation: Panel representation, Group representation, and Elements representation. The rendering of each GUI element within these representations will follow the Rendering Guideline below.

Figure 10:
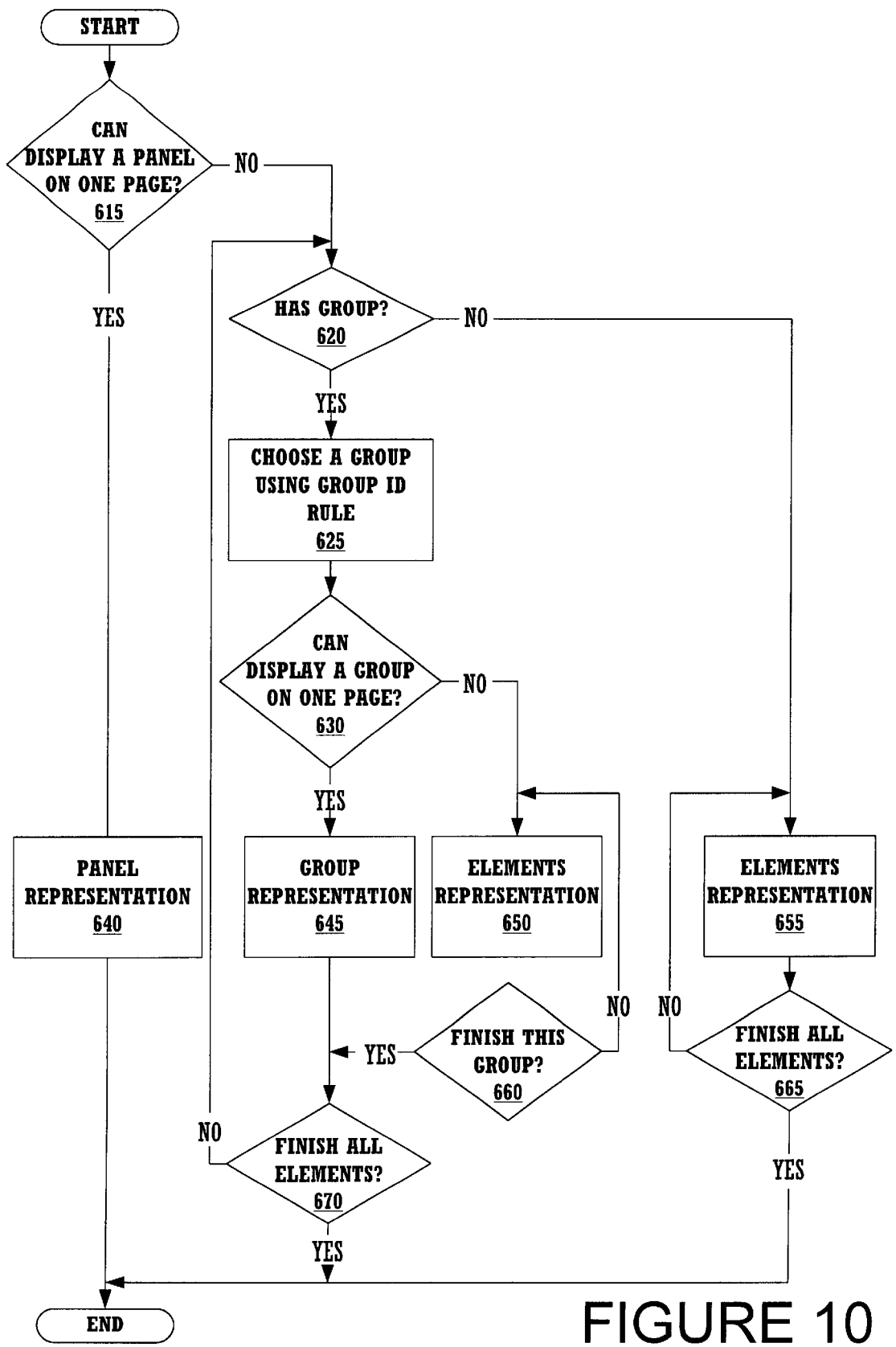
FIG. 10 is a flow diagram illustrating the steps performed by the present invention for displaying and presenting a representation of a panel as defined by the DDI of the present invention.

FIG. 10 illustrates a process 610 performed in accordance with an embodiment of the present invention for the display of the graphical user interface on the controller device 220. At step 615, it is determined if the panel display can be done. If so, then at step 640, a panel representation is displayed otherwise step 620 is entered. For panel representations, all elements of one panel list in DDI data are displayed as one page on the DDI controller's screen. DDI data also provides the navigation information among panels, e.g., pages.

At step 620, it is determined if a group is present. If so, then step 625 is entered where a group is selected using the group ID rule. At step 630, a determination is made if a group can be displayed. If so, step 645 is entered. For group representations, all elements of one group list in DDI data is are displayed. as one page on the DDI controller's screen. The ID (e.g., GuiElementId) of each group determines the display priority, e.g., the first page of the DDI controller displays the group that has the lowest ID number. The controller adds any necessary navigation information among pages on each page by using embedded icons, scroll bar, text data, etc. Step 670 is then entered to finish all elements.

With respect to step 650 of FIG. 10, for elements representation, some GUI elements in DDI data are displayed as one page on the DDI controller's screen. The DDI controller itself decides the number of GUI elements on one page. The controller adds any necessary navigation information among pages on each pages by using embedded icons, scroll bar, text data, etc. A check is made at step 660 if the group is finished. It is appreciated that at step 620 if no group is present, elements are directly represented as shown by steps 655 and 665.

With regard to priority, first, the DDI controller uses panel representation on the screen, if it has enough display capability to display this representation. Second, If the DDI controller does not have panel representation capability and has Group representation capability, then it uses group representation on the screen. Third, if the DDI controller has neither panel representation nor group representation capability, then it uses element representation on the screen.

Figure 11:
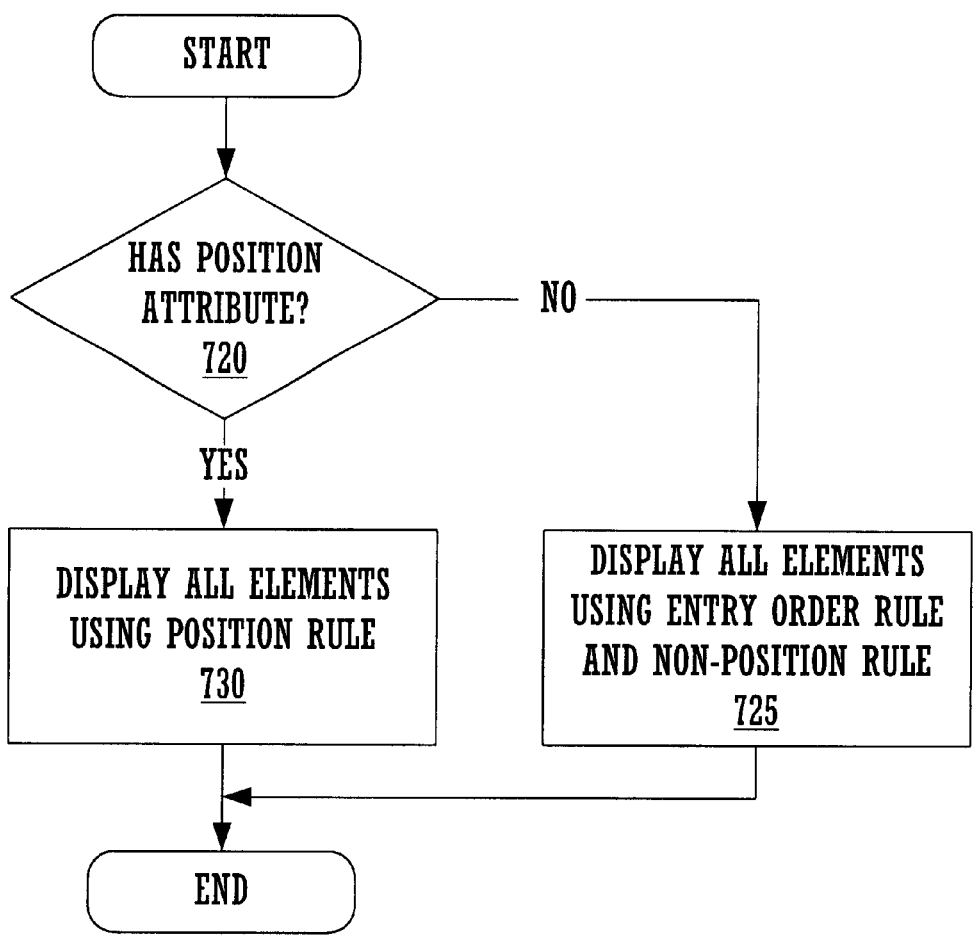
FIG. 11 is a flow diagram of the panel and group representation in accordance with the present invention.

FIG. 11 illustrates a process 710 performed by the present invention regarding rendering guidelines for panels and groups. A DDI controller displays GUI elements on a page according to the layout rules: position rule, and non-position rule. For position rule, step 730, each GUI element that has the position attribute, is rendered at the location where the position attribute indicates. This rule takes priority over the Non-Position rule. For non-position rule, step 725, the GUI element, that has the highest priority, is rendered in the upper-left corner of the page. A second element is rendered on the right of the first element, and so on. When the top line on the page is filled up, the next line is rendered below all GUI elements on the top line. The order of priority is described below.

Figure 12:
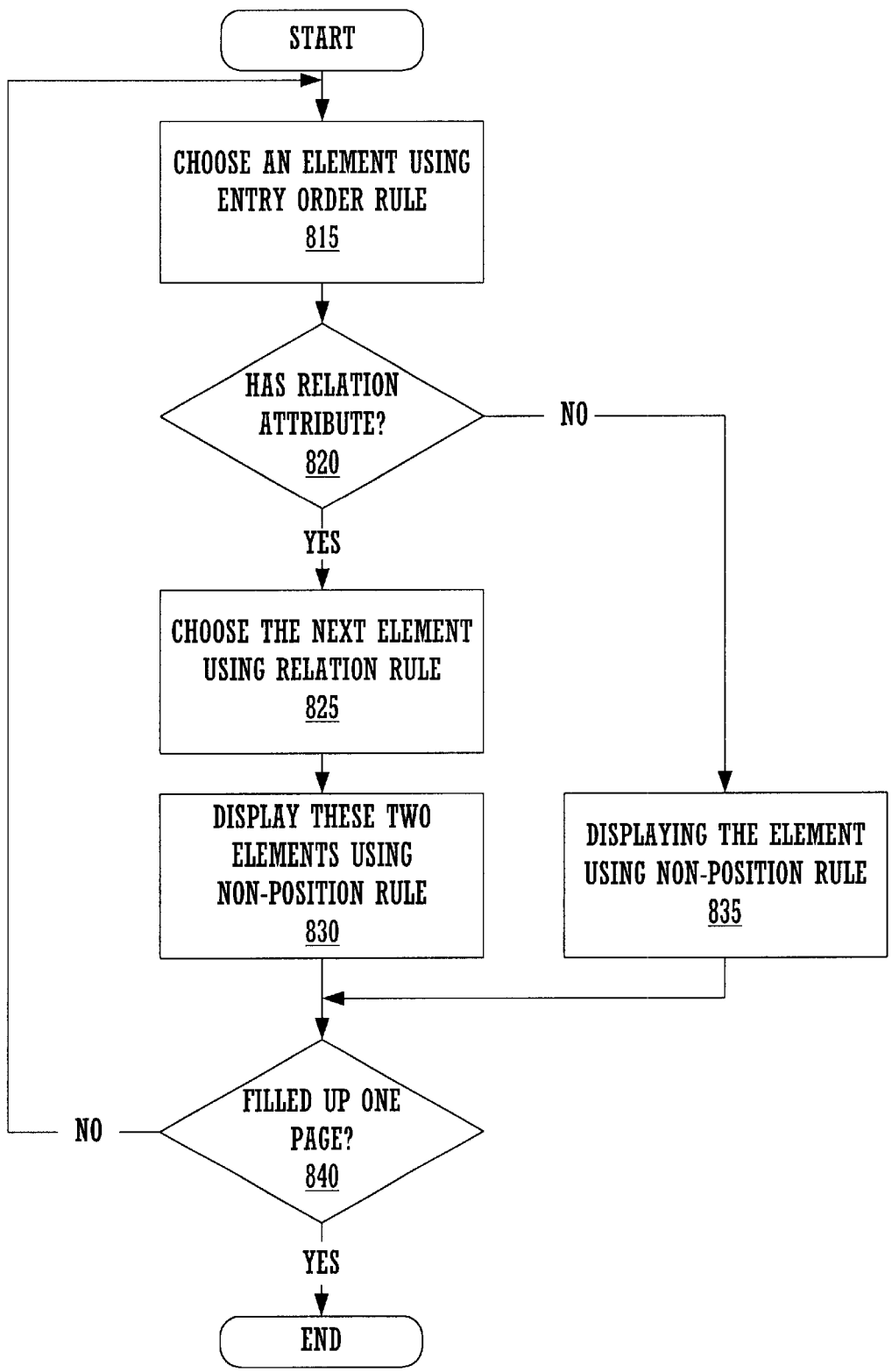
FIG. 12 is a flow diagram of the element representation in accordance with the present invention.

FIG. 12 illustrates a process 810 performed by the present invention regarding the order of priority guidelines. The group ID rule indicates that each GUI element in a group follow the group ID priority; that is, the GUI elements in the group with the lower ID number have the higher display priority. This rule takes priority over the entry order rule, step 815. Regarding the entry order rule, each GUI element that has no position attribute in all representations or whose position attribute is invalid in the case of elements representation, is rendered in the order of these entries of GUI elements in the panel or group list. For example, in the case in which a panel list has two entries, the first entry is a group list and the second entry is an icon, and the group list has two entries. The first entry is a button and the second is text data. In this case, the order of the display priority is: the button >the text data> the icon.

Regarding the relation rule, step 820, if a GUI element has the relation attribute, the DDI controller uses this for a choice of GUI elements, step 825. That is, after the controller chooses the first GUI element, the second one is suggested by the relation attribute of the first one. This rule takes priority over both the Group ID rule and the Entry Order rule, when the controller finds the GUI element which should be displayed next and if it has the relation attribute.

As stated above, if the position attribute of an icon is not valid for elements representation, neighboring icons by using their position attributes may not be rendered together. So icons which are to be rendered together should be described as one icon. There is no guarantee to maintain the same look and feel if a DDI target changes an icon in DDI data. It depends on the DDI controller's capability. However, if the controller displays this icon on the screen and the panel or group which this icon belongs to is active, then the DDI controller should replace this icon as soon as the DDI controller receives the NotifyGuiChange message and gets the changed icon data.

The preferred embodiment of the present invention, a DDI mechanism for remotely interfacing with a DDI target device via a DDI controller within a network of consumer electronic devices, is thus described. While the present invention has been described in particular embodiments, it should be appreciated that the present invention should not be construed as limited by such embodiments, but rather construed according to the below claims.

What is claimed is:

1. In a network of electronic devices including a target and a plurality of controllers, a method of controlling said target comprising the steps of:
   a) a controller requesting information from said target regarding controlling said target;
   b) said target sending elements of a user interface to said controller, said target maintaining in memory a structured description of said user interface including organizational and non-organizational elements;
   c) said controller generating said user interface based on said control elements and based on the display capabilities of said controller, said controller also allowing a user to interact with said user interface and sending user event messages to said target in response thereto;
   d) said target interpreting said user event messages, and in response, altering an operational state of said target and generating a state change message for said plurality of controllers; and
   e) said plurality of controllers updating their respective user interface based on said state change message from said target, said target thereby maintaining consistency among all of said plurality of controllers.

2. A method as described in claim 1 wherein said organizational elements define logically grouped functionality of said target and comprise panel elements and group elements.

3. A method as described in claim 1 wherein said non-organizational elements comprise a text element for representing a text string, a button element for representing a button and a choice element for representing a discrete set of possible input values.

4. A method as described in claim 3 wherein said non-organizational elements further comprise an entry element for allowing a user to enter a value and a range element for representing a predefined range.

5. A method as described in claim 1 wherein said step a) comprises the step of generating a message to said target requesting a root element identification.

6. A method as described in claim 1 wherein said controller includes a user input device and a display device for generating said user interface and wherein said method further comprises the steps of:

said target updating its operational state based on input that is not directly related to said user event messages; and said target communication its updated operational state to said controller.

7. A method as described in claim 1 wherein said user event messages of said step c) each comprise an element identification and an action code and wherein said state change message of said step d) comprises an element identification and a state code.

8. A method as described in claim 1 further comprising the step of said controller subscribing to said target device for control thereof.

9. A method as described in claim 1 wherein said controller is a software program resident on a first electronic device.

10. A method as described in claim 9 wherein said target is a software program resident on a second electronic device.

11. In an audio/visual network of consumer electronic devices including a target means and a plurality of controller means, a system for providing networked control of said target means, said system comprising:

a) a controller means for requesting information from said target means regarding controlling said target means;

b) said target means for sending elements of a user interface to said controller means, said target means for maintaining in memory a structured description of said user interface including organizational and non-organizational elements;

c) said controller means also for generating said user interface based on said control elements and based on the display capabilities of said controller means, said controller means also for allowing a user to interact with said user interface and for sending user event messages to said target means in response thereto;

d) said target means also for interpreting said user event messages, and in response, altering an operational state of said target means and for generating a state change message for said plurality of controller means; and e) said plurality of controller means also for updating their respective user interface based on said state change message from said target means, said target means thereby maintaining consistency of among all of said plurality of controller means.

12. A system as described in claim 11 wherein said organizational elements define logically grouped functionality of said target means and comprise panel elements and group elements.

13. A system as described in claim 11 wherein said non-organizational elements comprise a text element for representing a text string, a button element for representing a button and a choice element for representing a discrete set of possible input values.

14. A system as described in claim 13 wherein said non-organizational elements further comprise an entry element for allowing a user to enter a value and a range element for representing a predefined range.

15. A system as described in claim 11 wherein said step a) comprises the step of generating a message to said target means requesting a root element identification.

16. A system as described in claim 11 wherein said controller means includes a user input device and a display device for generating said user interface.

17. A system as described in claim 11 wherein said user event messages of said step c) each comprise an element identification and an action code and wherein said state change message of said step e) comprises an element identification and a state code.

18. A system as described in claim 11 wherein said controller means is a set-top-box unit.

19. A system as described in claim 11 wherein said audio/visual network is compliant with the HAVi architecture.

20. A system as described in claim 19 wherein said target means is a Device Control Module (DCM) software program resident on an electronic device.

21. A system as described in claim 19 wherein said target means is a software program resident on an electronic device.

22. A network of electronic devices comprising:

a common network bus;

a target coupled to said network bus; and a plurality of controllers coupled to said network bus, wherein:

a controller generates a request to said target for information to control said target;

responsive to said request, said target operable to send said controller elements of a user interface, said target maintaining in memory a structured description of said user interface including organizational and non-organizational elements;

responsive to said elements and based on the display capabilities of said controller, said controller generating said user interface and allowing a user to interact therewith, said controller sending user event messages to said target;

said target interpreting said user event messages and based thereon altering an operational state of said target and for generating a state change message to said plurality of controllers in response thereto; and said plurality of controllers operable to update their respective user interface based on said state change message from said target, said target thereby maintaining consistency among all of said plurality of controllers.

23. A network as described in claim 22 wherein said organizational elements define logically grouped functionality of said target and comprise panel elements and group elements and wherein said non-organizational elements comprise a text element for representing a text string, a button element for representing a button and a choice element for representing a discrete set of possible values.

24. A network as described in claim 22 wherein said user event messages each comprise an element identification and an action code and wherein said state change message comprises an element identification and a state code.

* * * * *